(12) United States Patent
Cakmak et al.

(10) Patent No.: US 12,534,043 B2
(45) Date of Patent: Jan. 27, 2026

(54) FLEXIBLE PIEZOELECTRIC COMPOSITE FILMS, FLEXIBLE PIEZOELECTRIC IMPACT SENSORS, PEDESTRIAN PROTECTION SYSTEMS, AND RELATED METHODS

(71) Applicant: Purdue Research Foundation, West Lafayette, IN (US)

(72) Inventors: Mukerrem Cakmak, Lafayette, IN (US); Armen Yildirim, Newark, DE (US); Jesse Grant, West Valley City, UT (US); Mahmoud Yousef Ghannam, Canton, MI (US); Nagarpita Vidyanag, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 69 days.

(21) Appl. No.: 18/523,977

(22) Filed: Nov. 30, 2023

(65) Prior Publication Data

US 2024/0174197 A1    May 30, 2024

Related U.S. Application Data

(60) Provisional application No. 63/385,431, filed on Nov. 30, 2022.

(51) Int. Cl.
*B60R 21/34* (2011.01)
*B60R 19/48* (2006.01)
(Continued)

(52) U.S. Cl.
CPC ............ *B60R 21/34* (2013.01); *B60R 19/483* (2013.01); *B60R 21/0136* (2013.01); *H10N 30/04* (2023.02); *H10N 30/092* (2023.02); *H10N 30/302* (2023.02); *H10N 30/852* (2023.02); *H10N 30/878* (2023.02)

(58) Field of Classification Search
CPC ... B60R 21/34; B60R 19/483; B60R 21/0136; H10N 30/04; H10N 30/092; H10N 30/302; H10N 30/852; H10N 30/878
See application file for complete search history.

(56) References Cited

U.S. PATENT DOCUMENTS 5,797,623 A * 8/1998 Hubbard ............. G01P 15/0907
73/769
7,304,566 B2 * 12/2007 Mae ..................... B60R 21/0136
340/436

(Continued)

FOREIGN PATENT DOCUMENTS

| WO | WO-2006008298 A1 * | 1/2006 | ......... B60R 21/0136 |
| WO | WO-2017017904 A1 * | 2/2017 | ........... B60R 19/483 |
| WO | WO-2018003592 A1 * | 1/2018 | ............. B60R 21/00 |

*Primary Examiner* — Timothy Wilhelm
(74) *Attorney, Agent, or Firm* — Hartman Global IP Law; Gary M. Hartman; Domenica N.S. Hartman

(57) ABSTRACT

Flexible piezoelectric composite films, flexible piezoelectric impact sensors, pedestrian protection systems, and related methods. Such a flexible piezoelectric composite film includes a flexible matrix and a plurality of piezoelectric particles dispersed and embedded within the flexible matrix. The piezoelectric particles are arranged in columns aligned in a Z-direction along a thickness of the flexible matrix.

16 Claims, 18 Drawing Sheets

(51) Int. Cl.
 *B60R 21/0136* (2006.01)
 *H10N 30/04* (2023.01)
 *H10N 30/092* (2023.01)
 *H10N 30/30* (2023.01)
 *H10N 30/85* (2023.01)
 *H10N 30/87* (2023.01)

(56) References Cited

U.S. PATENT DOCUMENTS

| | | | |
|---|---|---|---|
| 7,837,305 B2* | 11/2010 | Hara | B41J 2/1635 |
| | | | 347/70 |
| 8,511,174 B2* | 8/2013 | Herrmann | B60C 1/00 |
| | | | 73/777 |
| 10,661,742 B2* | 5/2020 | Wakabayashi | B60R 21/0136 |
| 11,203,675 B2* | 12/2021 | Cakmak | C08K 3/042 |
| 11,552,240 B2* | 1/2023 | Cakmak | H10N 30/30 |
| 11,588,097 B2* | 2/2023 | Cakmak | H04R 29/001 |
| 2020/0098972 A1* | 3/2020 | Cakmak | H04R 31/00 |
| 2022/0158075 A1* | 5/2022 | Khaliq | H10N 30/092 |

* cited by examiner

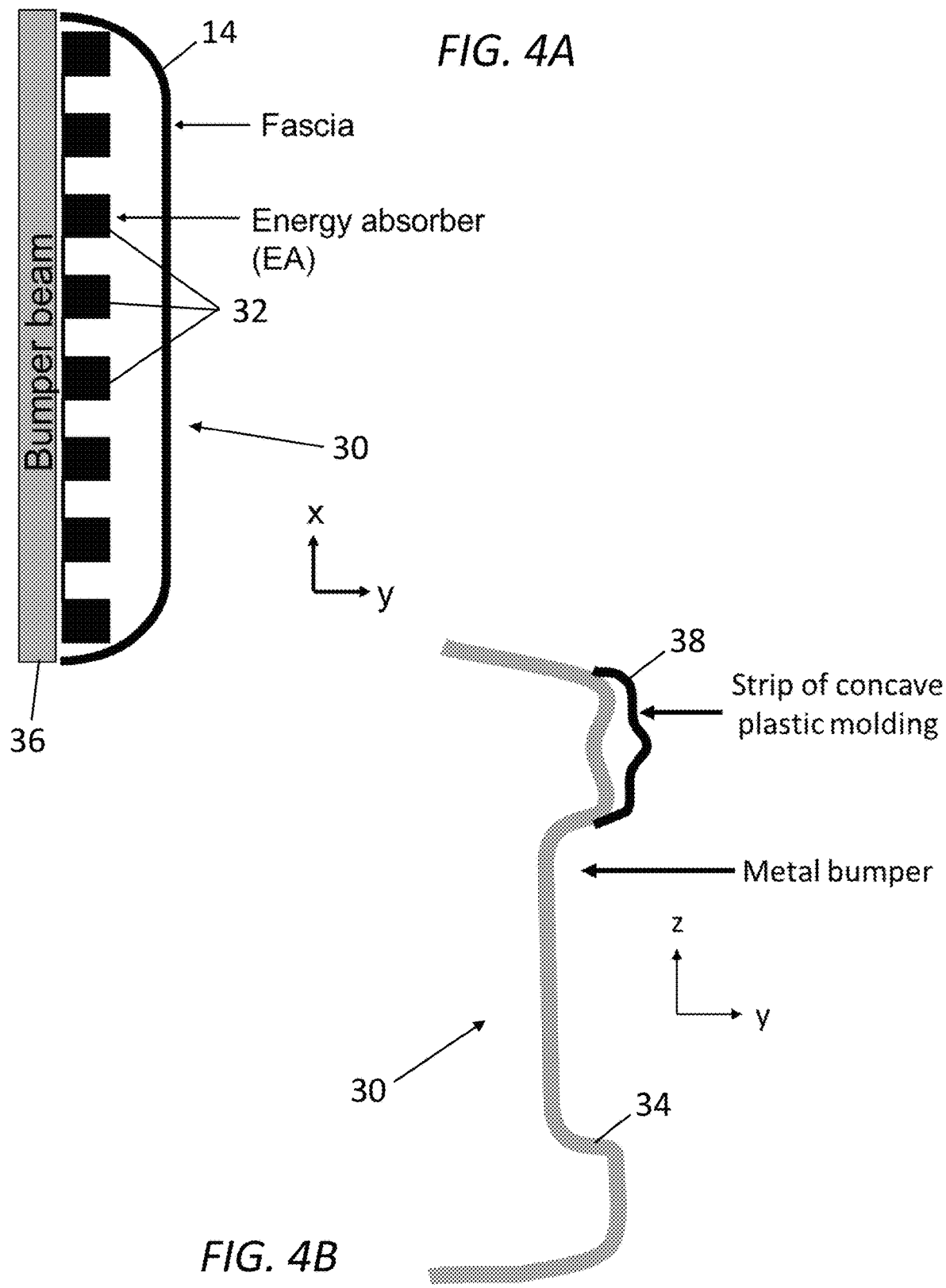

FLEXIBLE PIEZOELECTRIC COMPOSITE FILMS, FLEXIBLE PIEZOELECTRIC IMPACT SENSORS, PEDESTRIAN PROTECTION SYSTEMS, AND RELATED METHODS

CROSS-REFERENCE TO RELATED APPLICATIONS

This application claims the benefit of provisional U.S. Patent Application No. 63/385,431 filed Nov. 30, 2022, the contents of which are incorporated herein by reference.

STATEMENT REGARDING FEDERALLY SPONSORED RESEARCH

This invention was made with government support under grant number DGE-1842166 awarded by the National Science Foundation. The government has certain rights in the invention.

BACKGROUND OF THE INVENTION

The invention generally relates to flexible piezoelectric composite films, flexible piezoelectric impact sensors, pedestrian protection systems installed on vehicles, and methods of utilizing such films, sensors and systems to provide an impact sensing capability that can promote the protection of pedestrians and other roadway obstacles.

Vehicles and particularly passenger vehicles (e.g., automobiles, including cars and trucks) navigate challenging environments, and avoiding collisions is a significant aspect of those challenges. While collision avoidance via automatic emergency braking (AEB) technology is often the first line of defense (other than or in addition to typical human operator safe driving habits), impact detection is a critical last resort when engaging deployable pedestrian protection systems. Because the first collision event between a pedestrian and moving vehicle is usually between the pedestrian's leg and the front bumper fascia of an automobile, the instrumentation for implementing impact detection is accordingly typically placed in that area of the vehicle.

In conventional impact detection systems, there are several candidates for impact detection sensors designed for an active pedestrian protection system, for example, bend sensors, membrane switch sensors, and/or vibration sensors. Limitations of these sensors, however, include the difficulty of distinguishing between a pedestrian and other objects that may be encountered by a vehicle (e.g., small animals, birds, roadside structures, debris, etc.), the latter of which are referred to herein as misuse objects and create a misuse condition of an impact detection system that does not warrant activation of the system. Accelerometers are typically used in conventional impact detection systems. However, accelerometers typically have poor discrimination and are costly at the required frequency response and bandwidth. These accelerometers also typically have a high profile when mounted, which limits the backward travel of the bumper fascia upon impact because the smaller the available gap distance, the more likely that false signals will interfere due to a secondary impact between the sensor and rearward components.

A significant complexity with an impact detection system intended for use in a pedestrian protection system is the desire to mitigate damage to a pedestrian in the event of a vehicle colliding with the pedestrian, which requires rapidly producing actionable information for the electronic control unit (ECU) of the vehicle. The ECU must consider multiple inputs, all feeding into the decision to trigger deployment of one or more collision avoidance systems, such as an automatic braking system or an automatic pop-up hood system, within a prescribed sensing time ($t_S$). In turn, $t_S$ is added to the deployment time ($t_D$) to determine the total response time ($t_{TR}$) of the pedestrian protection system, as represented in the following equation:

$$t_S + t_D = t_{TR}. \tag{Eq. 1}$$

Typically, a short window of 15 ms from the moment of impact ($t_0$) is allowed for $t_S$ because $t_{TR}$ is constrained by the head-impact time ($t_{HI}$), based on the physics of the human body wrapping around the front of the vehicle. Ultimately, avoiding misuse cases (e.g., deployment of the pedestrian protection system when there is an impact with a non-human and often smaller object) is important not only for customer satisfaction, but also for safety. For example, in a frontal collision with an object or other vehicle, an erroneously deployed pop-up hood could compromise the strength of the crush zone or otherwise limit the driver's field of view.

Thus, there is a need for systems and devices therefore that are capable of detecting impacts in pedestrian protection applications that eliminate, mitigate, and/or reduce the effect of one or more of the shortcomings pointed out above.

BRIEF SUMMARY OF THE INVENTION

The intent of this section of the specification is to briefly indicate the nature and substance of the invention, as opposed to an exhaustive statement of all subject matter and aspects of the invention. Therefore, while this section identifies subject matter recited in the claims, additional subject matter and aspects relating to the invention are set forth in other sections of the specification, particularly the detailed description, as well as any drawings.

The present invention provides, but is not limited to, flexible piezoelectric composite films, flexible piezoelectric impact sensors, pedestrian protection systems, and methods intended or capable of sensing potential impacts with pedestrians.

According to a nonlimiting aspect, a flexible piezoelectric composite film is provided. The flexible piezoelectric composite film includes a flexible matrix and a plurality of piezoelectric particles dispersed and embedded within the flexible matrix. The piezoelectric particles are arranged in columns aligned in a Z-direction along a thickness of the flexible matrix.

According to another nonlimiting aspect, a flexible piezoelectric impact sensor is provided. The flexible piezoelectric impact sensor includes a flexible piezoelectric composite film as described above disposed between a first flexible electrode disposed on a first side of the flexible piezoelectric composite film and a second flexible electrode disposed on a second side of the flexible piezoelectric composite film.

According to yet another nonlimiting aspect, a pedestrian protection system for an automobile is provided. The pedestrian protection system includes a bumper assembly, a flexible piezoelectric impact sensor as described above coupled to the bumper assembly, and a pedestrian protective measure. The pedestrian protective measure is configured to be activated when the flexible piezoelectric impact sensor senses an impact with a pedestrian.

According to still another nonlimiting aspect, a method of producing a flexible piezoelectric composite film entails combining piezoelectric particles and graphite nanoplatelet particles in a polymer resin. The piezoelectric particles, the graphite nanoplatelet particles, and the polymer resin are mixed to form a substantially homogenous dispersion. A hardener is added to the substantially homogeneous dispersion to form a slurry, and the slurry is cast into a substantially two-dimensional cast sheet having a thickness. An electrical field is applied to the cast sheet to align the piezoelectric particles and the graphite nanoplatelet particles in columns aligned in a Z-direction along the thickness of the cast sheet. The cast sheet is cured while maintaining the electrical field to form the flexible piezoelectric composite film having the piezoelectric particles and the graphite nanoplatelet particles embedded in a polymer matrix formed by the polymer resin.

According to preferred but nonlimiting aspects of the invention, flexible piezoelectric composite films, flexible piezoelectric impact sensors, pedestrian protection systems, and methods as described above are capable of enabling a pedestrian protection application to discriminate between a pedestrian and a small animal.

These and other aspects, arrangements, features, and/or technical effects will become apparent upon detailed inspection of the figures and the following description.

BRIEF DESCRIPTION OF THE DRAWINGS

FIG. 4A illustrates a testing setup for the flexible piezoelectric impact sensors of FIGS. 1B and 1C on a plastic bumper assembly.

FIG. 4B illustrates a testing setup for the flexible piezoelectric impact sensors of FIGS. 1B and 1C on a metal bumper assembly.

DETAILED DESCRIPTION OF THE INVENTION

Figure 1A:
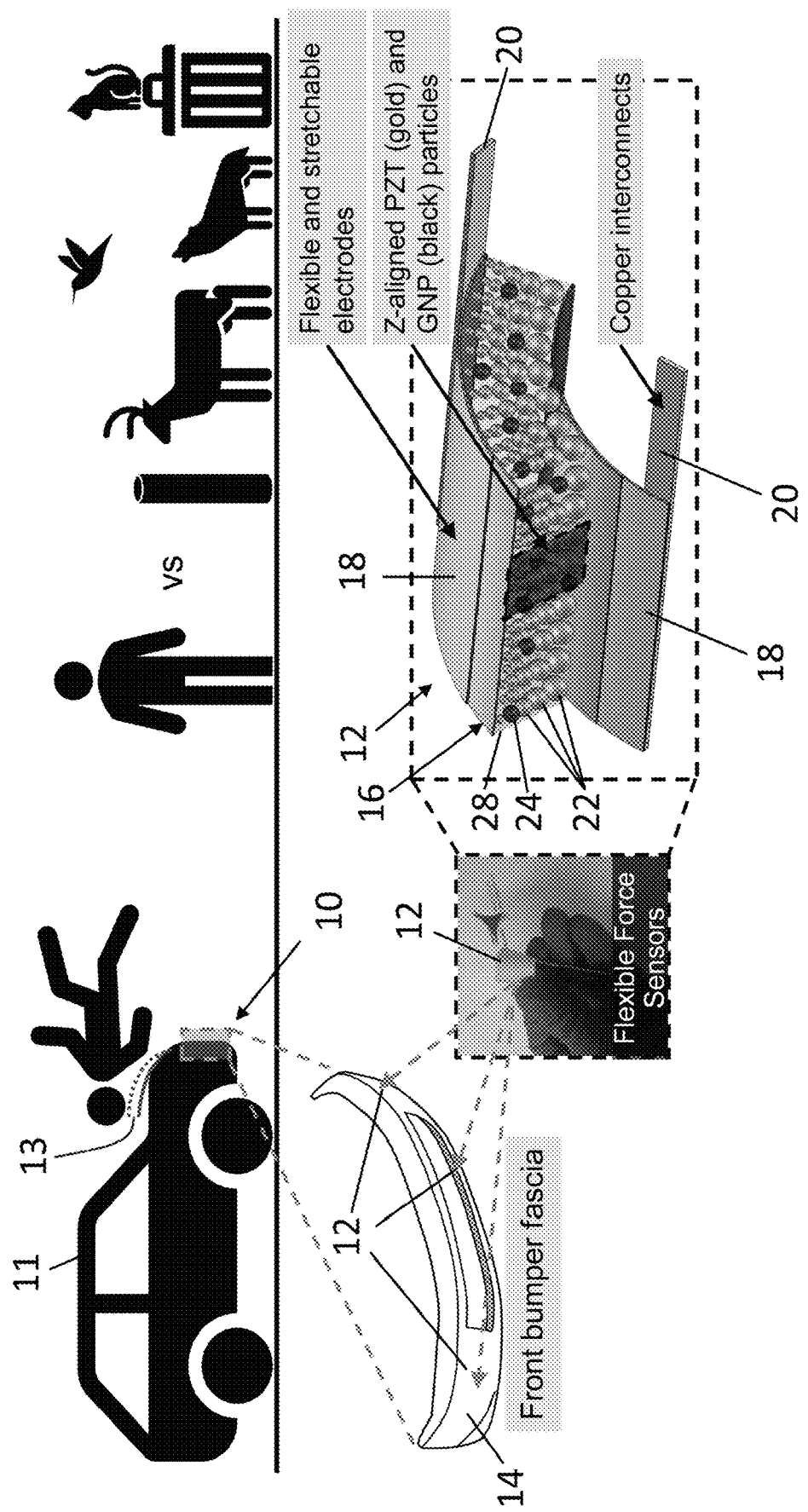
FIG. 1A is a schematic diagram of a pedestrian protection system according to certain nonlimiting aspects of the invention.

The intended purpose of the following detailed description of the invention and the phraseology and terminology employed therein is to describe what is shown in the drawings, which include the depiction of and/or relate to one or more nonlimiting embodiments of the invention, and to describe certain but not all aspects of the embodiment(s) to which the drawings relate. The following detailed description also describes certain investigations relating to the embodiment(s) depicted in the drawings, and identifies certain but not all alternatives of the embodiment(s) depicted in the drawings. As nonlimiting examples, the invention encompasses additional or alternative embodiments in which one or more features or aspects shown and/or described as part of a particular embodiment could be eliminated, and also encompasses additional or alternative embodiments that combine two or more features or aspects shown and/or described as part of different embodiments. Therefore, the appended claims, and not the detailed description, are intended to particularly point out subject matter regarded be aspects of the invention, including certain but not necessarily all of the aspects and alternatives described in the detailed description.

As used herein, the terms "a" and "an" to introduce a feature are used as open-ended, inclusive terms to refer to at least one, or one or more of the features, and are not limited to only one such feature unless otherwise expressly indicated. Similarly, use of the term "the" in reference to a feature previously introduced using the term "a" or "an" does not thereafter limit the feature to only a single instance of such feature unless otherwise expressly indicated.

The technology of the present disclosure generally pertains to impact sensing and/or detection for pedestrian protection applications and/or systems utilizing piezoelectric ceramic/polymer composite films. Disclosed herein are applications in which mechanically flexible polymer composites are configured to form low-profile sensors that are fully compatible with large-scale manufacturing. Because vehicle surfaces are typically curvilinear, the ability of sensors made with these flexible polymer composites to intimately interface with and conform to various non-planar geometries of vehicle surfaces is well suited for contact-based measurements.

Polymer composites represent a reasonable low-cost and low-profile alternative to accelerometers used in conventional impact detection sensor systems. Polymer composites can employ several modalities, predominately piezoresistive and piezoelectric phenomena, enabling the composites to be tunable via their material properties. Piezoresistive materials are well adapted for static loads, whereas piezoelectric materials are unpowered and have a fast response (low response time), giving them an advantage for dynamic events such as a pedestrian impact. Other potential benefits for the vehicle may include a wake function to activate other systems while minimizing the power draw from the battery, preventing, or discouraging acts of vandalism through an alarm, video recording, or any other security system.

In some arrangements, the present invention generally relates to a piezoelectric film-based sensor (hereinafter sometimes simply referred to as a piezoelectric sensor) that detects a collision between the vehicle's bumper and an impactor. One or more nonlimiting embodiment encompass mounting one or more piezoelectric sensors within a front bumper assembly of a vehicle. Each piezoelectric sensor includes a multilayer structure in which a core layer of the sensor is a piezoelectric composite film sandwiched between layers of flexible electrodes. The piezoelectric sensor provides a voltage signal based on compression and elastic wave propagation resulting from impact. Calibrated time-domain and frequency-domain thresholding of the voltage signal amplitude are then employed to distinguish between the deployment of a pedestrian protection system, for example, for a pedestrian impact, and non-deployment of a pedestrian protection system, for example, for a non-pedestrian impact, such as an impact with a small animal, trash can, automobile, or other non-human object. However, the invention is not limited to this arrangement, and also relates to other arrangements, systems, methods, components, and devices based on the present disclosure.

Conventional accelerometers and bulk ceramic piezoelectric sensors typically have high costs due to amplification circuitry and raw-material costs, respectively. In contrast, preferred but nonlimiting embodiments of the piezoelectric sensor typically do not require amplification circuitry and use very little of a functional component (e.g., 0.5 vol % of a piezoelectric ceramic) that has excellent electromechanical properties and is embedded in a tough, flexible plastic matrix, avoiding the issues of brittleness and poor impact resistance.

To achieve characteristics as described above, the present invention preferably implements a technique known as electric-field (E-field) alignment, which organizes piezoelectric ceramic particles in micro/nano columns along an applied electric field oriented in a thickness direction of the intended piezoelectric composite film to form a nanoparticle "forest" within a polymer matrix. The resulting highly anisotropic piezoelectric composite film takes on robust mechanical properties, including flexibility, toughness, and impact resistance. To optimize performance for impact-sensing applications, the micro/nano columns are preferably oriented parallel to the impact direction to maximize their compressive deformation. As a result, these piezoelectric composite films provide a rapid, repeatable, and robust voltage response. This is complemented by low-cost and scalable manufacturability that has been demonstrated on a continuous production line.

Turning now to the drawings, FIG. 1A depicts portions of a pedestrian protection system 10 that embodies certain preferred principles of the present invention. In a deployment case, the pedestrian protection system 10 operates one or more pedestrian protective actions (measures), such as raising the hood 13 (its upward trajectory represented by a dashed line) of an automobile 11, to mitigate trauma to the pedestrian's head (adapted from Euro NCAP10). The pedestrian protection system 10 could be implemented to activate other types of pedestrian protective measures. Examples of non-deployment cases (misuse objects) include but are not limited to small animals, poles, trash cans, barriers, etc., that the automobile 11 may encounter. A bumper fascia 14 of the front bumper assembly of the automobile 11 is represented as equipped with multiple flexible force (flexible piezoelectric impact) sensors 12 that implement certain principles of the present invention to detect impacts. As seen in the lower right of FIG. 1A, a preferred architecture of such an impact sensor 12 is represented as including a flexible piezoelectric composite film 16 as the active layer of the sensor 12, and is shown as sandwiched by and between flexible electrodes 18 for electrical readout with copper electrical interconnects 20. Within the flexible piezoelectric composite film 16 can be seen Z-aligned piezoelectric particles 22 and graphite nanoplatelet (GNP) particles 24, all of which are aligned along the Z-axis, which in this example is in the thickness direction and perpendicular to the general X-Y plane defined by the width and length directions of the composite film 16. Preferably, the piezoelectric composite film 16 has the form of a substantially two-dimensional (2D) sheet in which the thickness in the Z-direction is negligible relative to its width and length in the X and Y directions, such as at least one or two (or more) orders of magnitude less than the width and length in the X-Y plane. A preferred but nonlimiting material for the piezoelectric particles 22 is a piezoelectric ceramic material, such as lead zirconate titanate ("PZT").

Figure 1B:
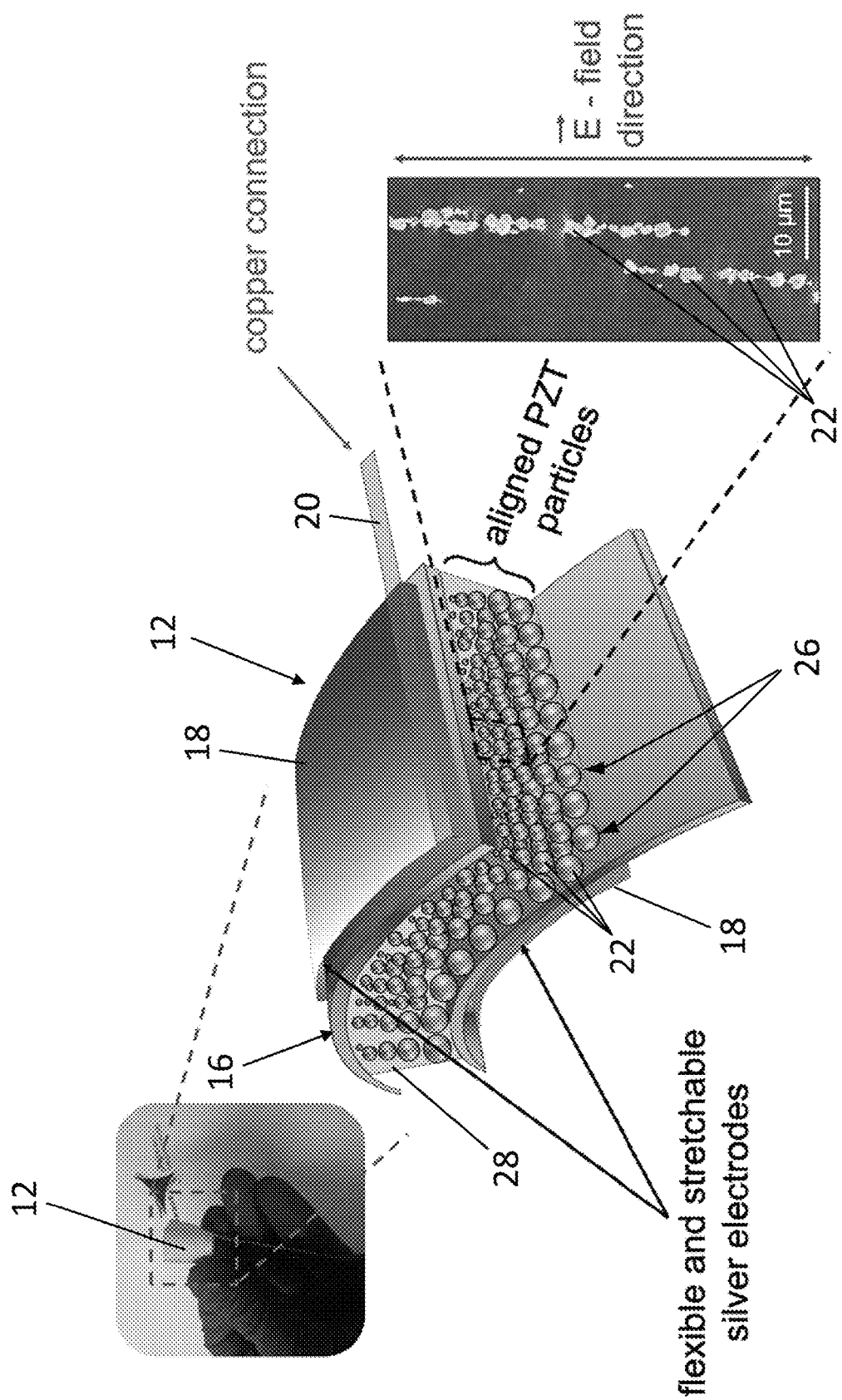
FIGS. 1B, and 1C illustrate nonlimiting aspects of flexible piezoelectric impact sensors according to certain nonlimiting aspects of the invention that are implemented in the pedestrian protection system shown in FIG. 1A.

In FIG. 1B, an embodiment of a flexible piezoelectric impact sensor 12 is shown in the upper left being flexed between a person's fingers into a curved configuration. In the center of FIG. 1B, a schematic diagram illustrates various elements of the flexible piezoelectric impact sensor 12, including the aligned piezoelectric particles 22 forming a "forest" of generally parallel columns 26 embedded within a flexible polymer matrix 28 of the piezoelectric composite film 16, two flexible electrodes 18 disposed on opposite sides of the composite film 16, and the electrical interconnects 20 electrically coupled to the flexible electrodes 18. In this example, the flexible electrodes 18 are flexible and stretchable silver electrodes, however, other types of flexible electrodes could be used. On the right is shown an enlarged view of the aligned PZT particles 22 forming generally parallel columns embedded in the flexible polymer matrix 28 with the columns extending axially generally in the Z-direction of the flexible piezoelectric composite film 16.

Figure 1C:
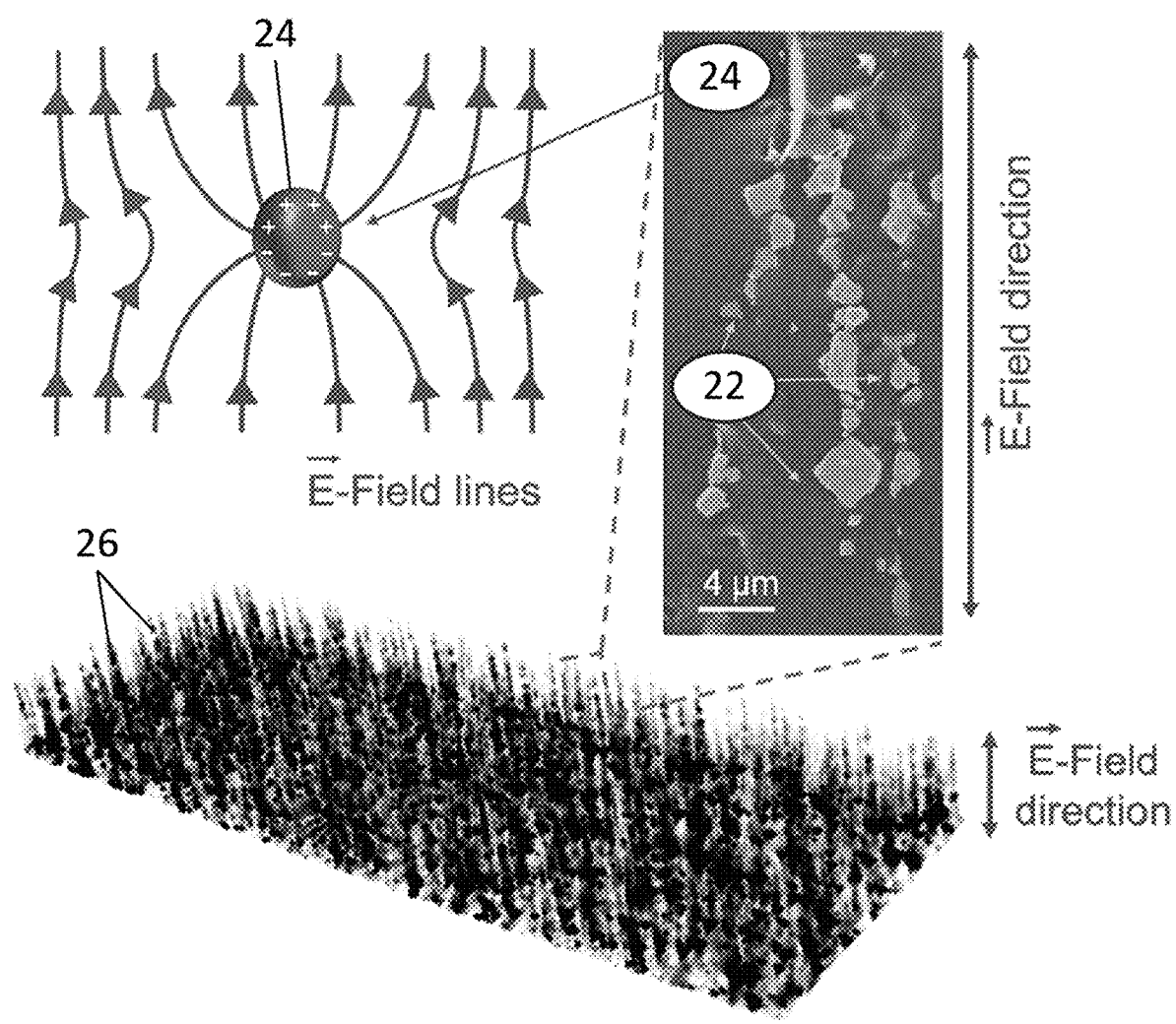

The upper left of FIG. 1C illustrates how the electric-field lines are influenced by the presence of the GNP particles 24 within the flexible piezoelectric composite film 16. This directly affects the morphology of the through-thickness columns 26 of PZT particles 22 and GNP particles 24 as shown in the SEM micrograph on the right. False color is added for clarity. A 3D reconstruction from a micro-CT scan in the lower portion of FIG. 1C illustrates the extremely anisotropic morphology of the through-thickness nanoparticle forest of columns 26 formed by the PZT particles 22. The flexible piezoelectric composite film 16 can be cut down to form sensors 12 of arbitrary sizes, as nonlimiting examples, 1×1 $cm^2$, 2×2 $cm^2$, and 3×3 $cm_2$. However, the flexible piezoelectric impact sensor 12 of the present invention advantageously can be configured in an essentially unlimited different shapes and sizes.

In investigations leading to the present invention, piezoelectric composite films 16 were produced by combining about 0.5 vol % PZT (NCE55, Noliac) particles 22 and about 0.02 vol % GNP particles 24 (Sigma-Aldrich) with polydimethylsiloxane (PDMS) resin (Sylgard 184, Dow) that formed the flexible polymer matrix 28. The PZT particles 22 were sieved and manually crushed with a mortar and pestle to control the size range to be between about 25 and about 38 µm. The GNP particles 24 and PDMS resin were used as received. The PZT particles 22, GNP particles 24, and PDMS resin were mixed in a planetary centrifugal mixer (Thinky Mixer, ARE-310) to form a homogenous dispersion, after which a hardener was added in a recommended 10:1 ratio before remixing. To further improve the homogeneity of the dispersion, the material at the walls and bottom of the mixing container were manually stirred back into the bulk before briefly remixing it in the centrifugal mixer. To avoid sedimentation, the resulting slurry was immediately cast into a generally 2D sheet form on an ITO-coated glass slide at a thickness of 1 mm using a smooth scraper bar. An E-field (1 kV/mm, 100 Hz) was supplied by a high-voltage amplifier (AMP-20B20-LC, Matsusada). Spacers set the distance between electrodes for applying the E-field to control the strength of the E-field, leaving an air gap. The samples were then cured at 80° ° C. while maintaining the E-field.

In addition, piezoelectric composite films 16 were produced with OG675 (Epoxy Technology) epoxy as the flexible polymer matrix 28. The same mixing, casting, and alignment procedures as described above were followed, except that GNP particles 24 were not included. Photocuring of the matrix 28 was performed with a UV pen lamp (84-2011-9, phosphor coated, peak intensity: 365 nm, Jelight) in a nitrogen atmosphere.

To fabricate the sensors 12, the piezoelectric composite films 16 produced as described above were overcoated with an electrode layer to form a flexible electrode 18 capable of providing electrical interconnects to the rest of the system. Electronic ink (Intexar Pe874, Dupont) was used for relatively low-energy impacts, and an electrically conductive polymer composite was used for higher-energy impacts. The flexible electrode 18 was composed of a randomly aligned composite of 20 vol % silver-coated nickel particles ("Ni@Ag") (Novamet) and PDMS. The Ni@Ag particles were heated in the oven at 210° C. overnight to improve conductivity by reducing the silver-oxide layer. The Ni@Ag particles were then mixed with PDMS resin in the planetary centrifugal mixer, and the resulting coating was stencil printed at a thickness of 300 μm. The flexible electrode 18 was cured over a copper strip that served as an electrical interconnect 20 to a jumper cable. An additional thin layer of PDMS was overcoated on the flexible electrode 18 for additional encapsulation of the sensor 12. In other arrangements, other types of flexible electrode 18 having different electrically conductive particles embedded within a different flexible matrix could be used.

Using the same flexible polymer matrix 28 for both the flexible piezoelectric composite film 16 and the flexible electrode 18 greatly improved the robustness and conformability of the sensor 12 by removing what would otherwise be an interface between two dissimilar materials. This greatly improved the compatibility with the pedestrian protection application 10, where the sensor 12 will be potentially operating under the high energy of a collision.

In investigations leading to the present invention, a systematic study was undertaken in which the high-performance piezoelectric composite films 16 were demonstrated as impact sensors 12 for the pedestrian protection application 10. For testing, lab-scale impact scenarios involved calibration testing represented in FIGS. 2A, 2B and 3, surrogate impactors (legform/small-animal model, representing deployment/non-deployment cases, respectively), and plastic and metal vehicle bumper assemblies 30 (FIGS. 4A, 4B, 5A, and 5B). The results showed that good discrimination was achieved between the two impactors for impacts directed at locations of the sensors 12 when mounted behind the bumper fascia 14. FIGS. 6A to 6D show the time- and frequency-domain results for the plastic bumper assembly 30 of FIG. 4A, and FIGS. 7A to 7D show the same for the metal bumper assembly 30 of FIG. 4B with the sensor 12 centrally located on the bumper. The simultaneous time-domain data for various sensor locations are given in FIGS. 8A to 8D. The effect of impact velocity on the plastic bumper assembly 30 is provided in FIGS. 9A-9C. Time-domain data for the OG675-based sensor are shown in FIGS. 10A and 10B, demonstrating an enhanced discrimination between impactors based on the voltage difference as compared to the PDMS-based sensor based on elastic modulus of the matrix (Table 1).

TABLE 1

Elastic-modulus values for matrix materials.

| Matrix Material | Elastic Modulus (MPa) |
| --- | --- |
| Sylgard 184 (PDMS) | 1.8 |
| OG675 | 3.8 |

Further details of tests performed during the systematic study performed are described hereinafter.

Figure 2A:
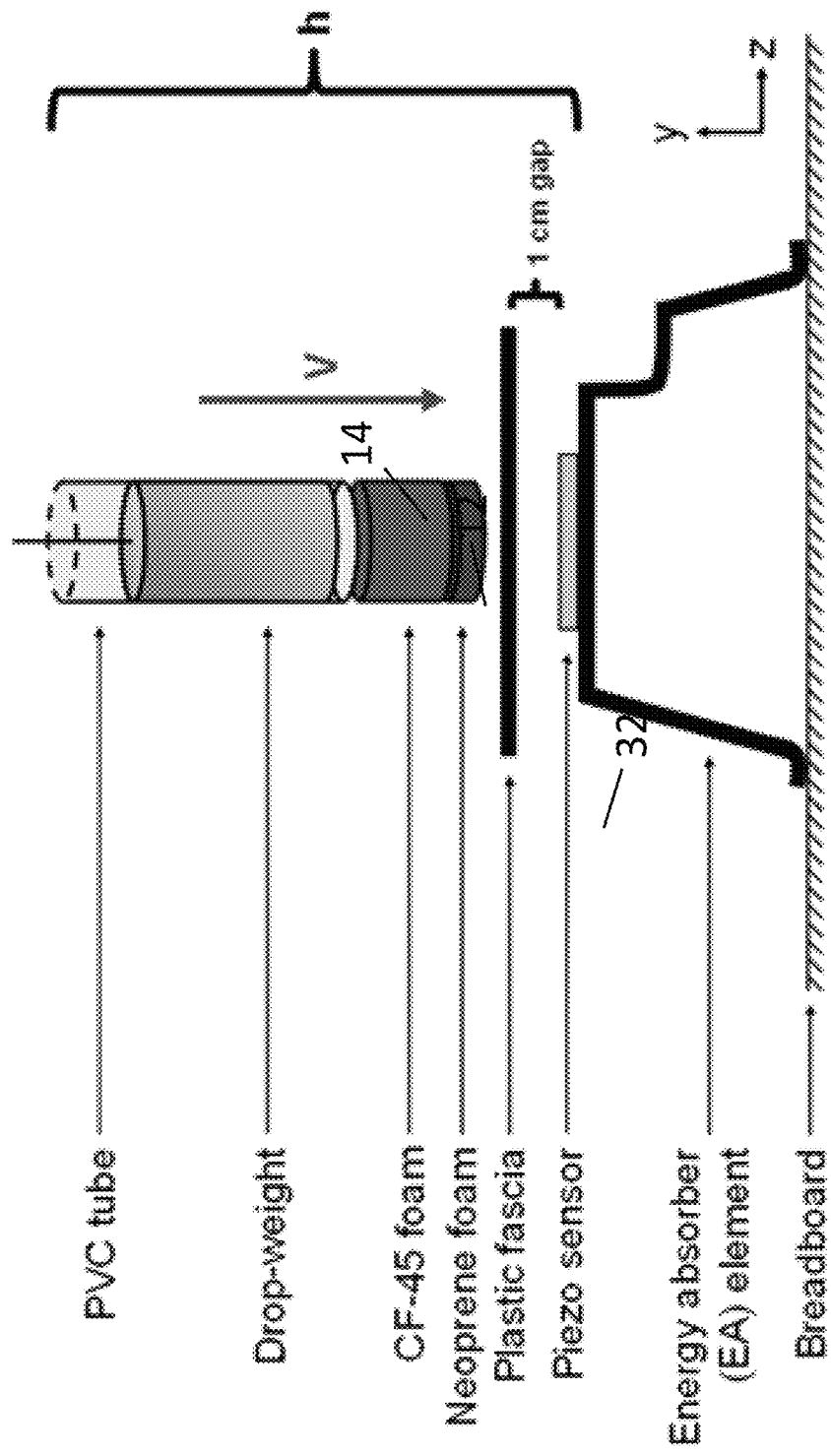
FIGS. 2A, 2B and 3 illustrates nonlimiting aspects of a calibration testing setup to test the flexible piezoelectric impact sensors of FIGS. 1B and 1C.
Figure 2B:
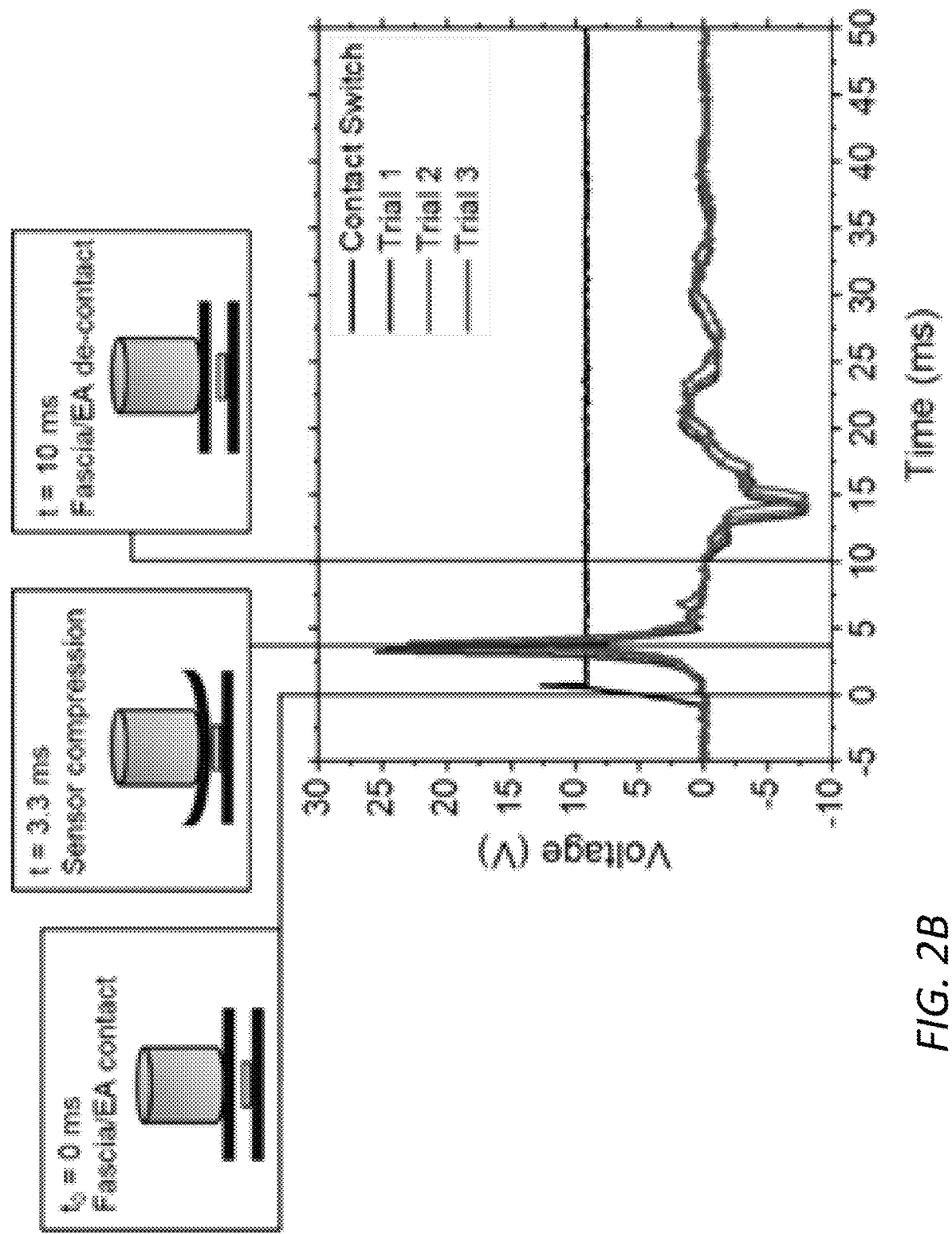

With reference to FIGS. 2A and 2B a drop-weight setup was implemented to match the electrical signal characteristics to the physical contact/de-contact events between the plastic fascia and energy absorber (EA) 32. FIG. 2A is a schematic that shows the various layers of the cross-sectional model system. In FIG. 2B, a plot of the voltage readout from tests performed with the setup of FIG. 2A includes inset schematics to illustrate the key timestamps, especially the initial peak associated with the compression caused by a cylindrical 0.5 lb. mass.

Figure 3:
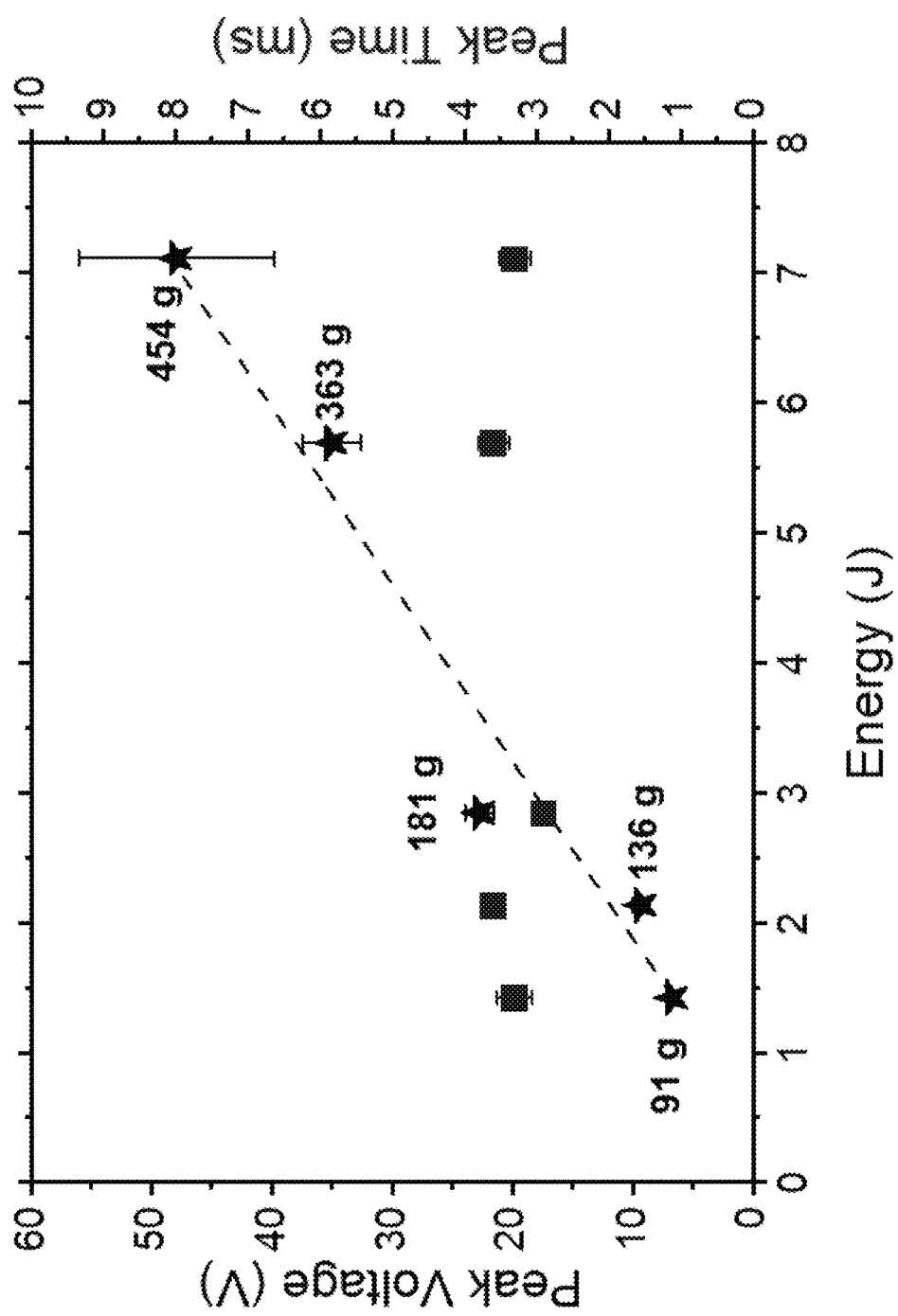

In FIG. 3, the compiled peak voltages vs. energy and associated peak times are shown for the set of drop weights, representing a calibration curve. The linear fit has the following parameters: slope of 7.3 V J−1, Y-intercept of 3.8 V, and R-squared of 0.89.

FIG. 4A schematically represents a plastic bumper assembly 30 comprising a plastic bumper fascia 14 and FIG. 4B schematically represents a metal bumper assembly 30 comprising a metal bumper 34. FIG. 4A is a top view of the plastic bumper assembly 30, which includes the bumper fascia 14, the energy absorber 32, and the bumper beam 36. FIG. 4B is a side view of metal bumper assembly 30 and its metal bumper 34, which includes a concave strip of plastic molding 38 along its upper ridge.

Figures 5A, 5B:
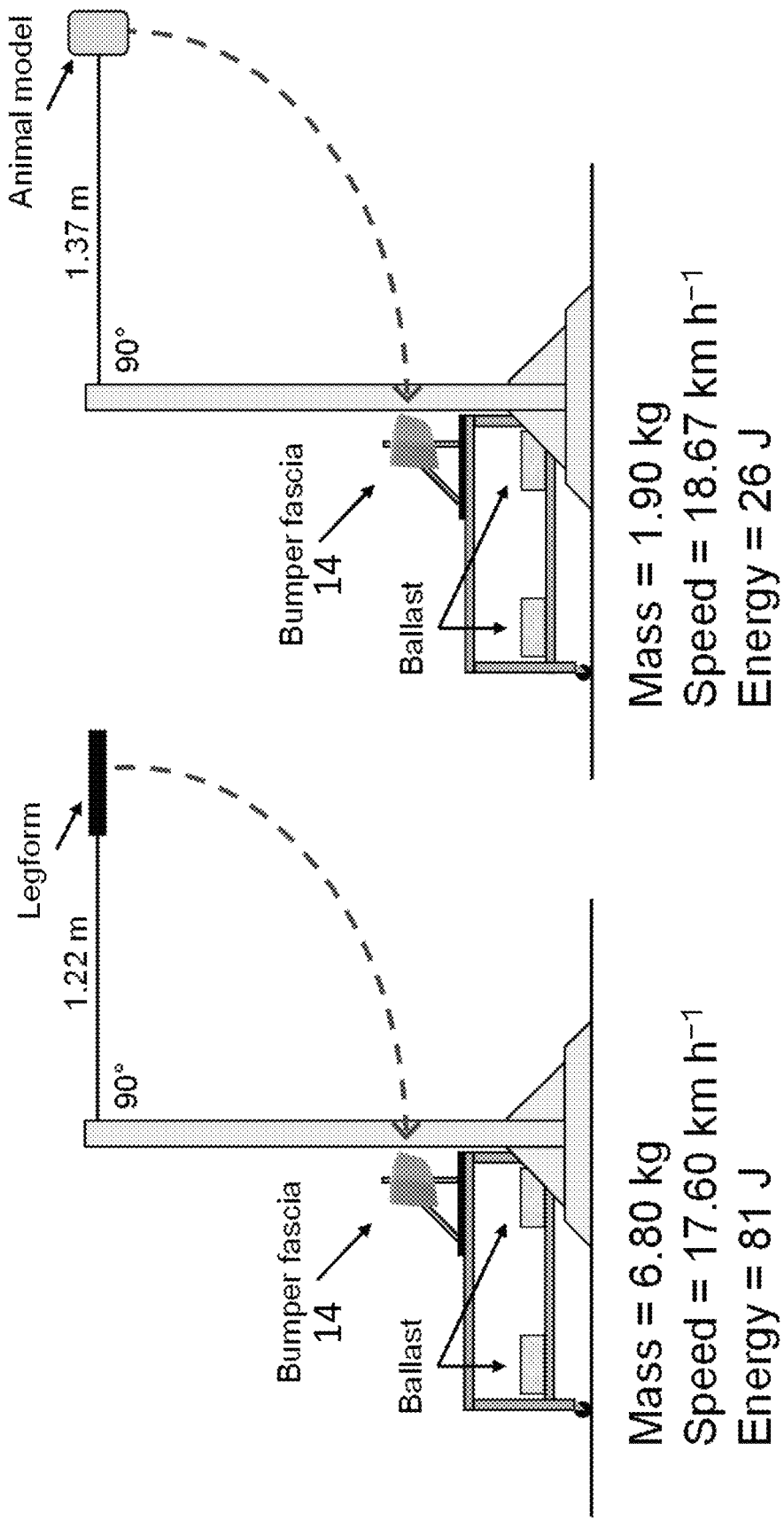
FIGS. 5A and 5B illustrate a testing setup for the flexible piezoelectric impact sensors of FIGS. 1B and 1C using a human legform model (FIG. 5A) and using an animal model (FIG. 5B).

FIGS. 5A and 5B illustrate a pendulum system used for testing the bumper fascia 14. FIG. 5A schematically illustrates the pendulum system for the legform impactor, which is the impactor of interest. FIG. 5B schematically illustrates the pendulum system for the small-animal model impactor.

Figure 6A:
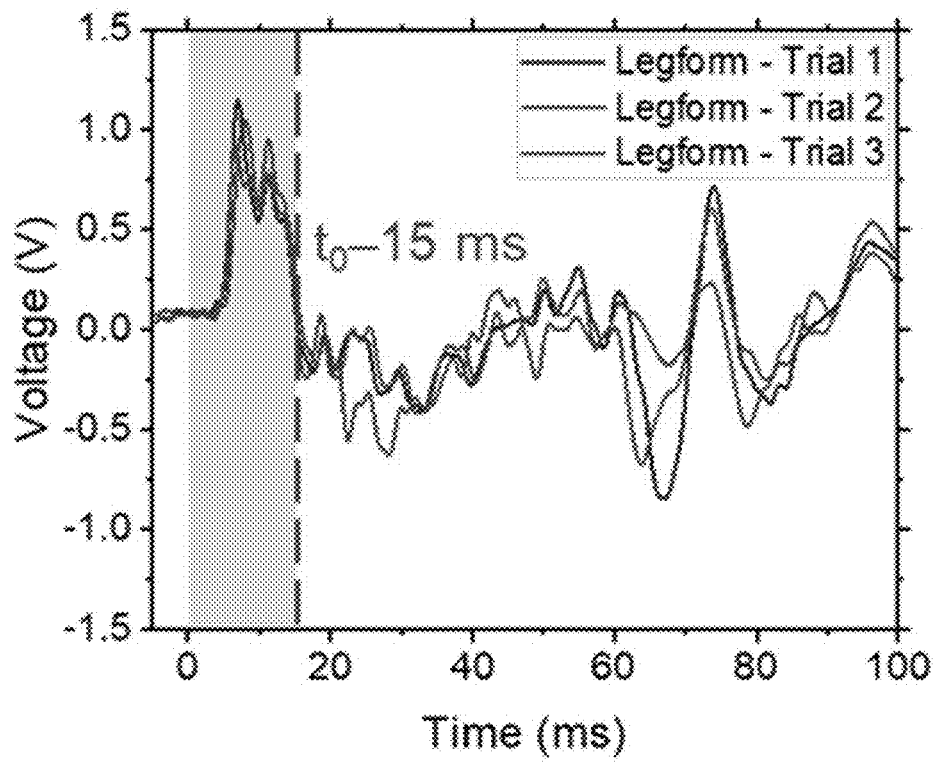
FIGS. 6A through 6D are graphs of test data from tests performed using the testing setup of FIGS. 5A and 5B with the plastic bumper assembly of FIG. 4A.
Figure 6B:
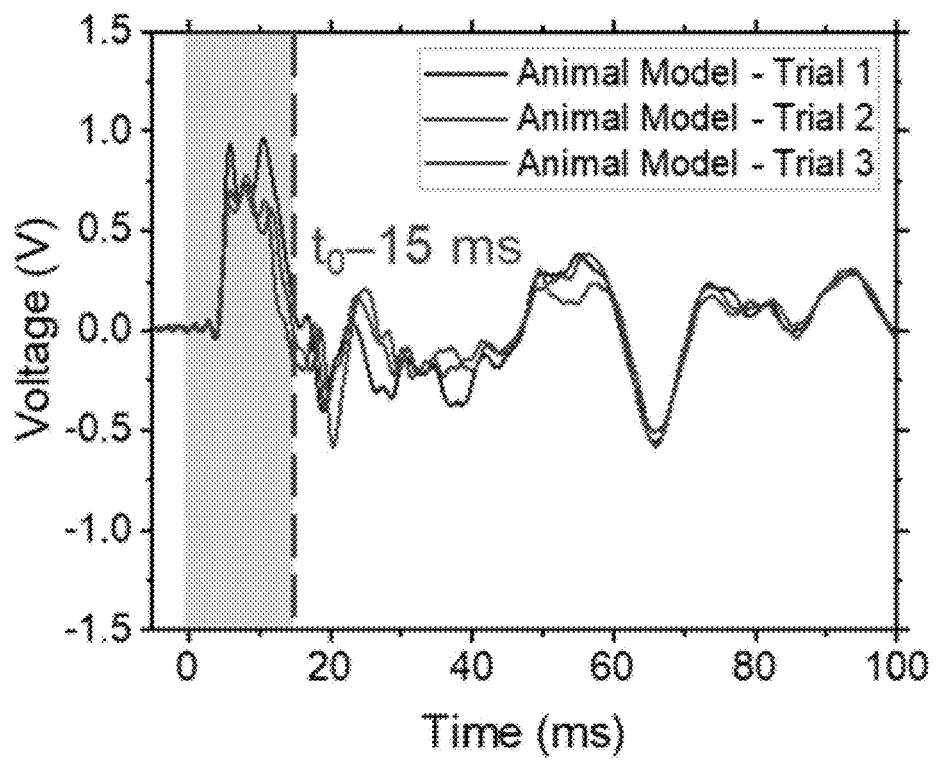
Figure 6C:
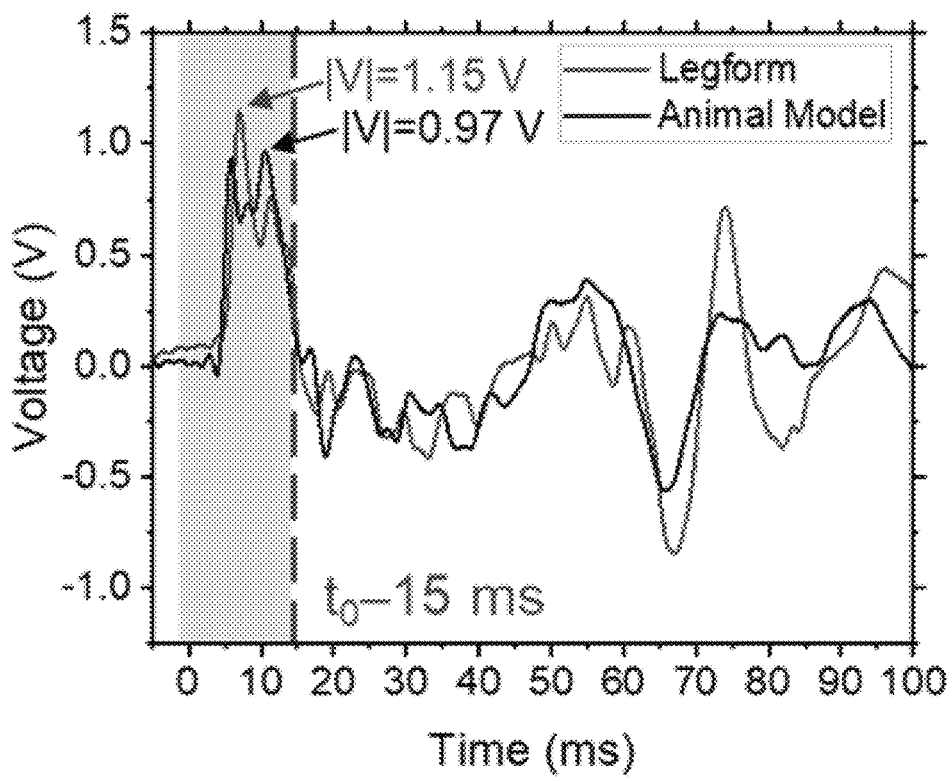
Figure 6D:
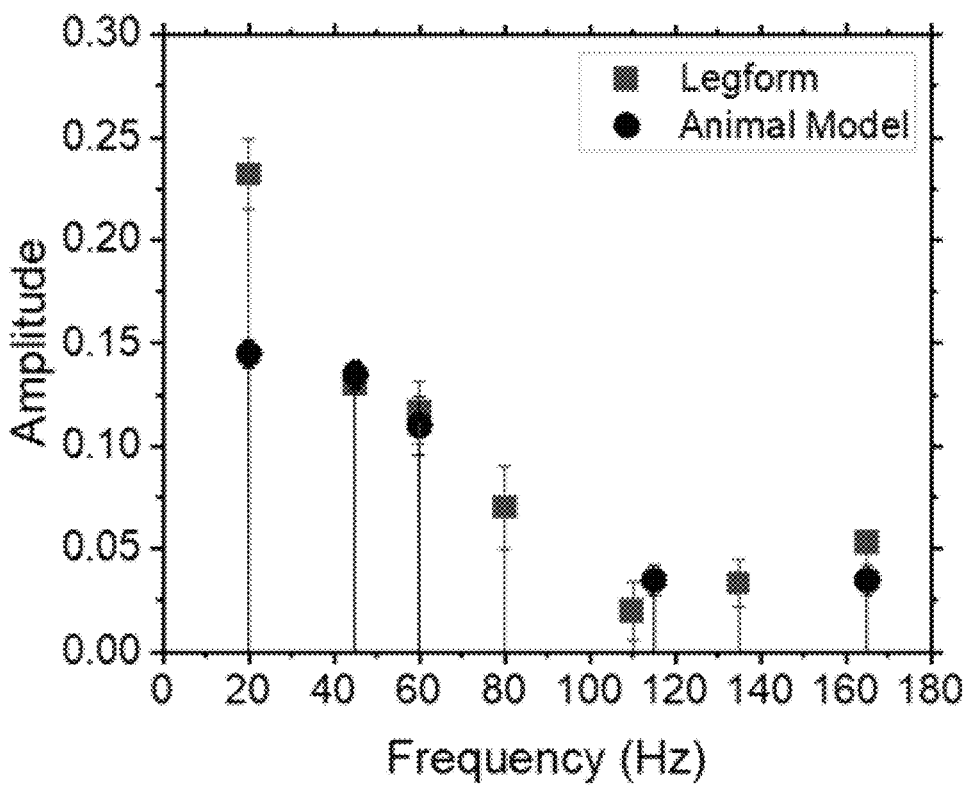

FIGS. 6A through 6D illustrate the voltage signals obtained for the plastic bumper fascia 14. Three trials demonstrate the repeatability of the legform model data (FIG. 6A) and animal model data (FIG. 6B). FIG. 6C shows an overlay of signals from the legform and animal-model impacts, with absolute peak voltages of 1.15 V and 0.97 V, respectively. As seen in FIG. 6D, the FFT peak values show that at 20 Hz, there is a percent difference of 46% between the legform and the animal model, with a couple of frequencies (80 Hz and 135 Hz) only excited by the legform.

Figure 7A:
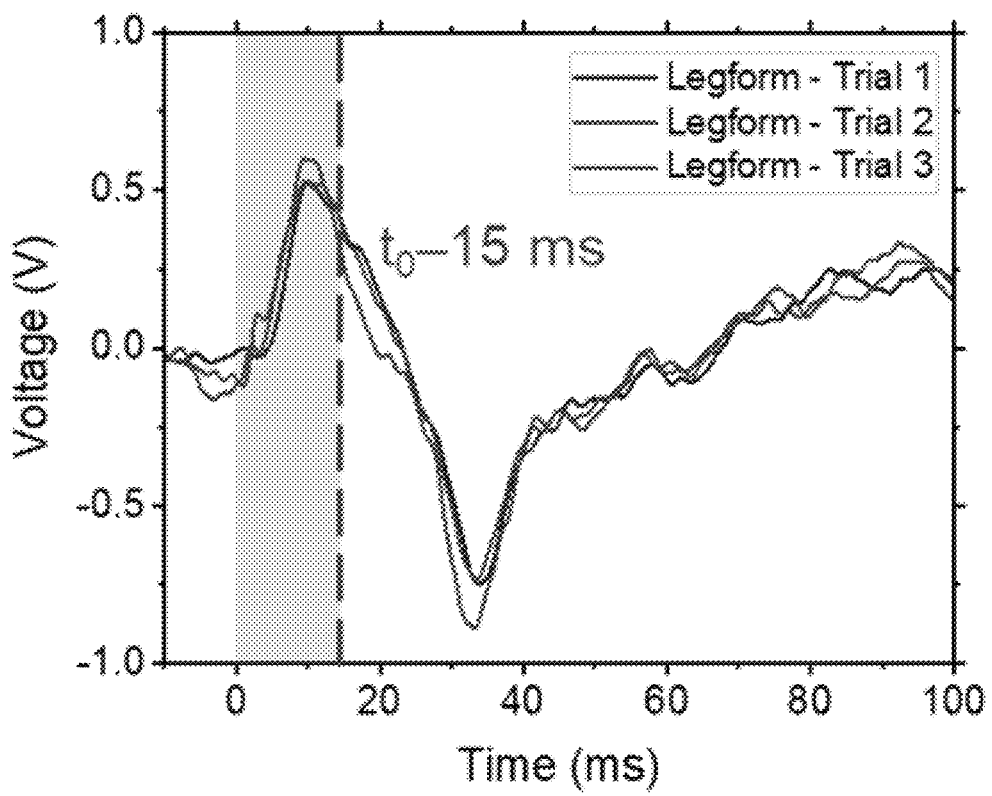
FIGS. 7A through 7D are graphs of test data from tests performed using the testing setup of FIGS. 5A and 5B with the metal bumper assembly of FIG. 4B.
Figure 7B:
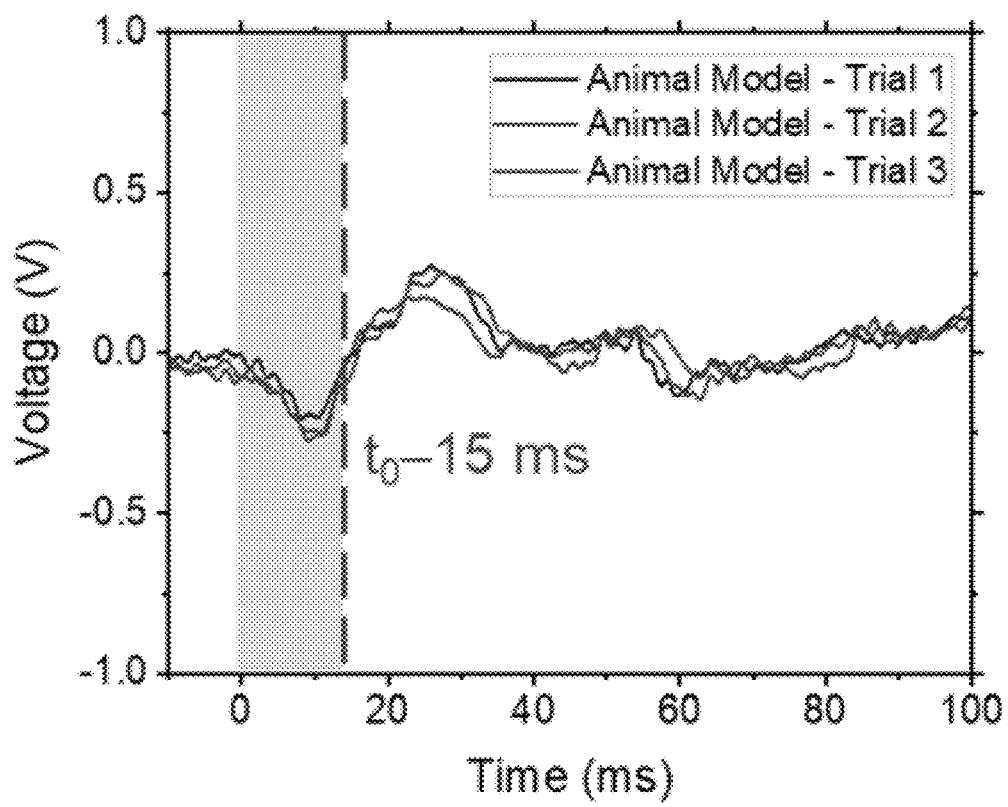
Figure 7C:
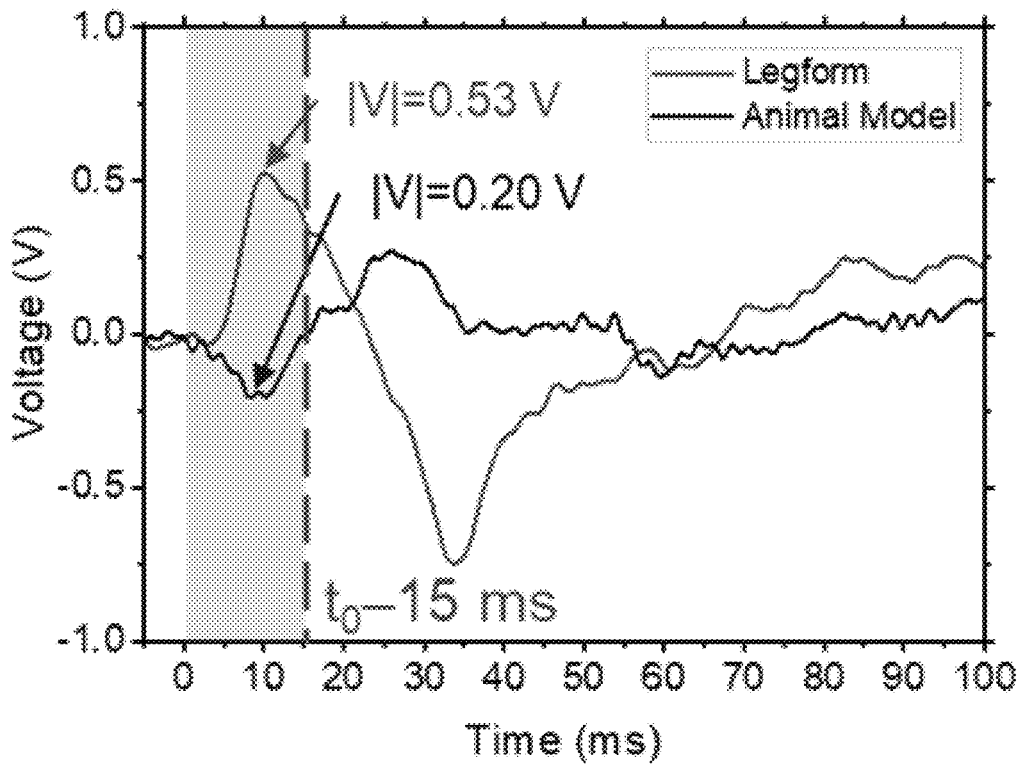
Figure 7D:
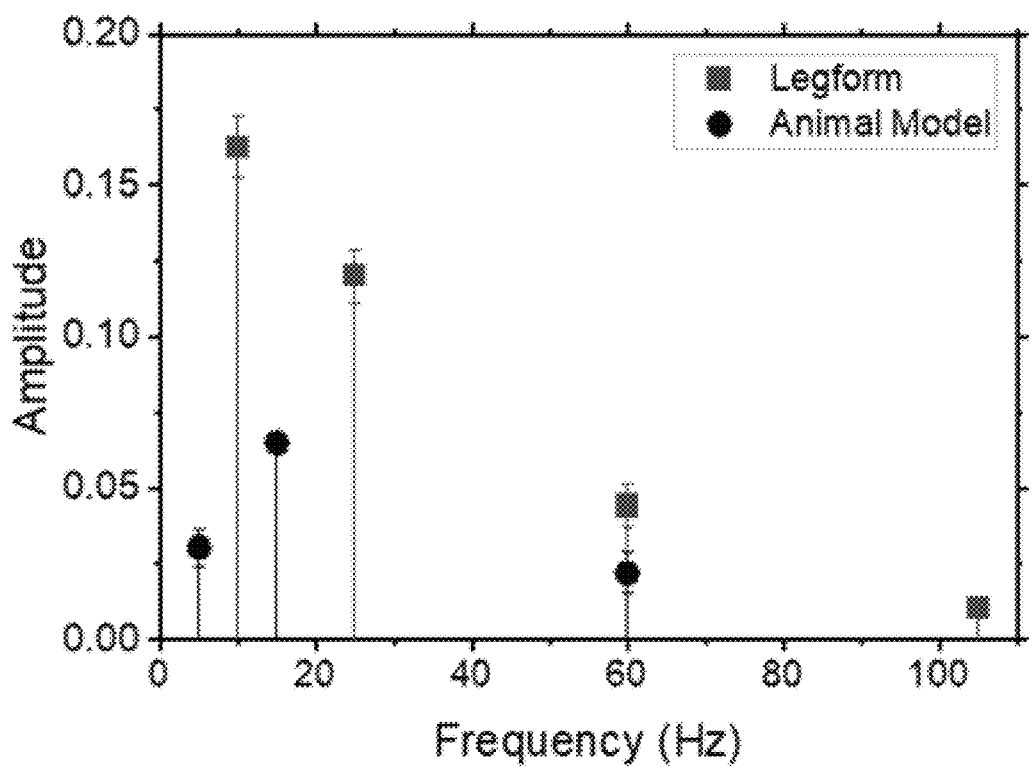

FIGS. 7A through 7D illustrate the voltage signals obtained for the metal bumper 34. Three trials for the middle impact sensor 12 demonstrated the repeatability of the legform model data (FIG. 7A) and the animal model data (FIG. 7B). FIG. 7C shows an overlay of signals from the legform and animal-model impacts, with absolute peak voltages of 0.53 V and 0.20 V, respectively. As seen in FIG. 7D, peak values from a fast Fourier transform (FFT) shows that in the low-frequency range below 30 Hz, there is a percent difference as high as 137% between the legform data and the animal model.

Figure 8A:
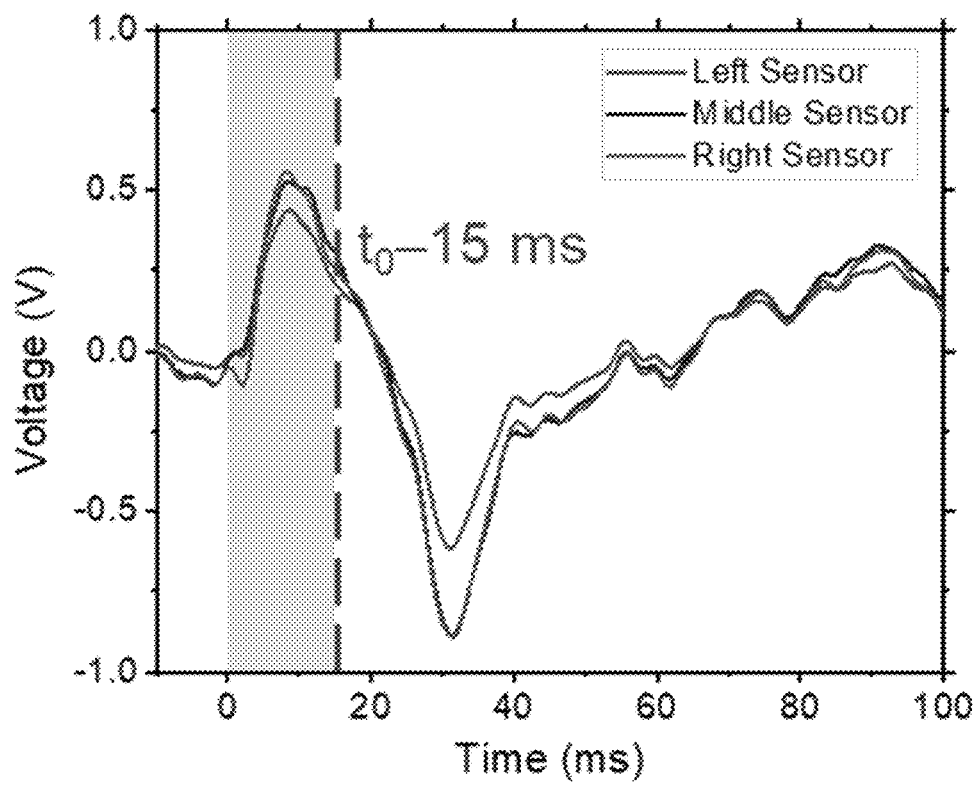
FIGS. 8A through 8D are graphs of test data with simultaneous time-domain data for various sensor locations.
Figure 8B:
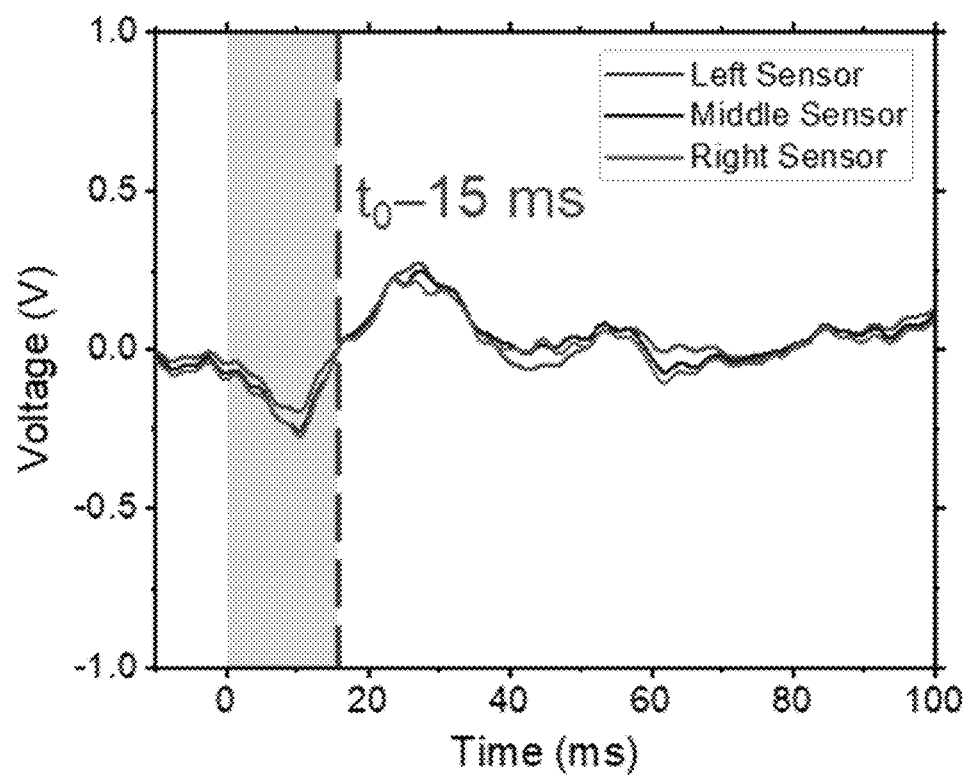
Figure 8C:
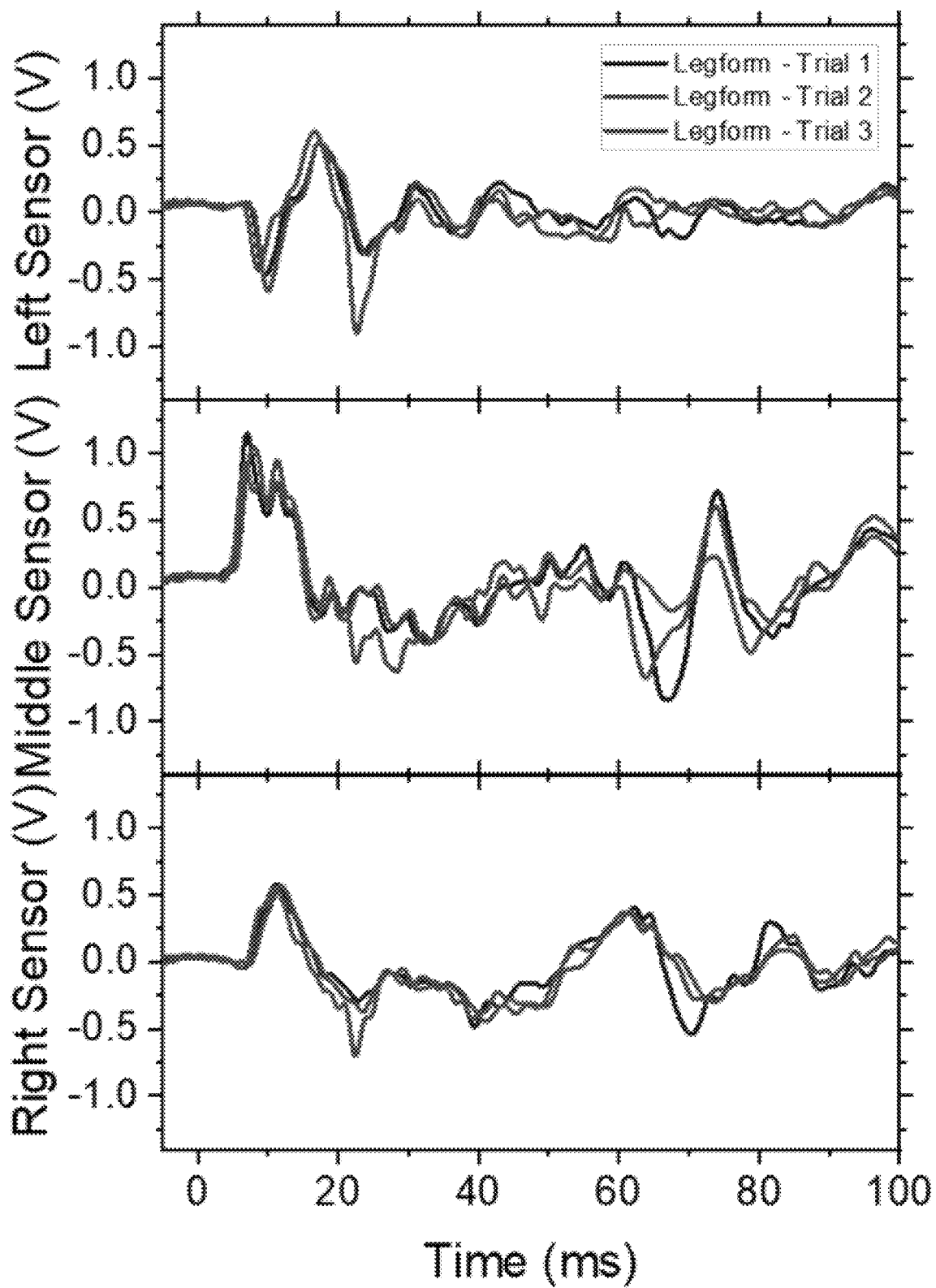
Figure 8D:
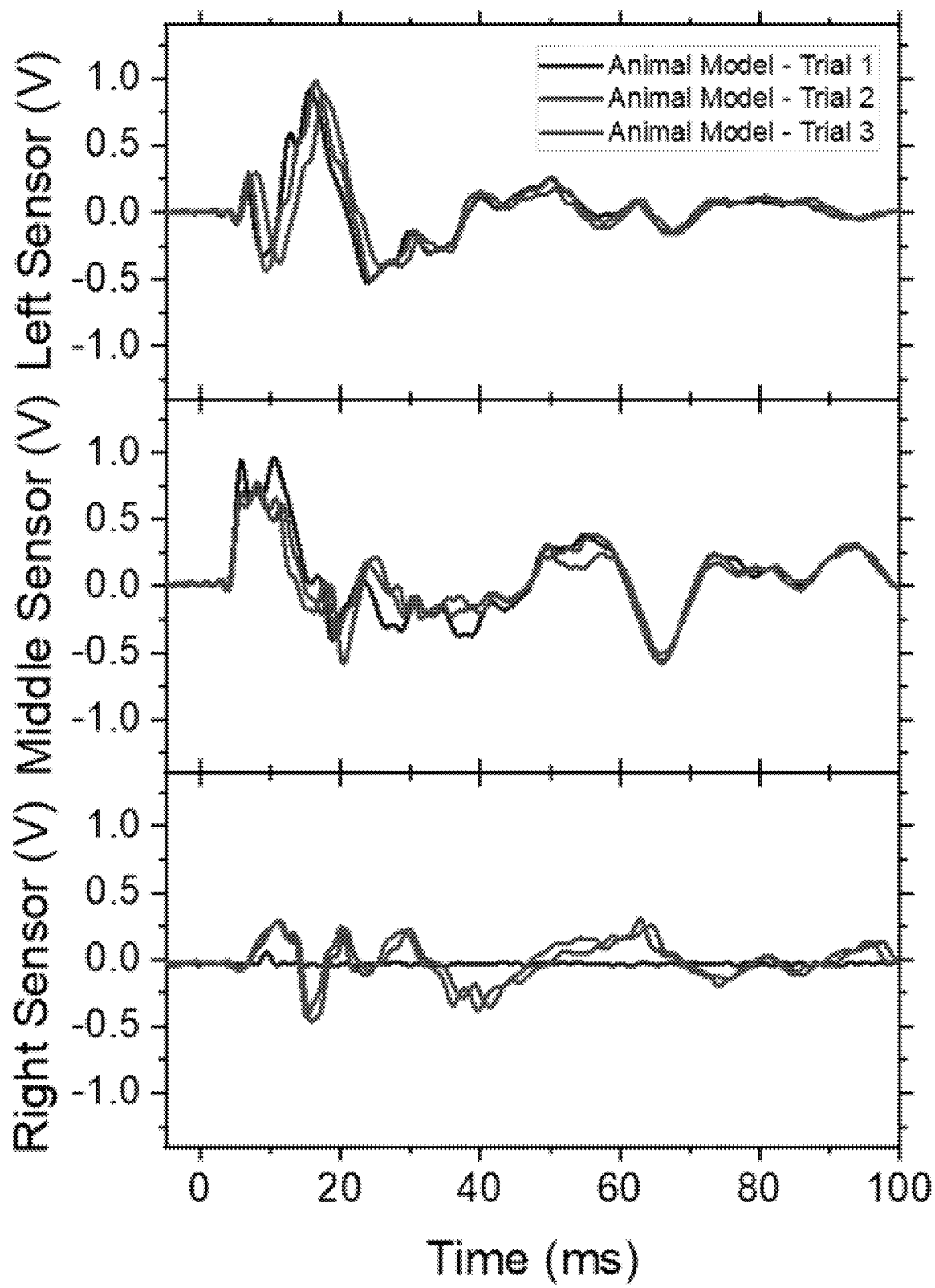

FIGS. 8A through 8D illustrate the voltage outputs for high-energy impact from sensors 12 across the metal and plastic bumper assemblies 30. The impact locations were on the middle sensor position. For the metal bumper 34 of the metal bumper assembly 30, the FIG. 8A shows the legform model voltage signals, and FIG. 8B shows the animal model voltage signals, with generally higher voltage output coming from the legform impacts. The left, middle, and right sensors 12 show very similar outputs due to the high stiffness and low damping of the metal bumper 34. For the plastic bumper fascia 14 of the plastic bumper assembly 30, FIG. 8C shows the legform model voltage signals and FIG. 8D shows the animal model voltage signals. Higher voltages were produced by the legform relative to the animal model from the middle impact sensor 12, while the other sensors 12 generally showed lower outputs, with some aberrant behavior due to the complex deformation behavior of the plastic bumper fascia 14.

Figure 9A:
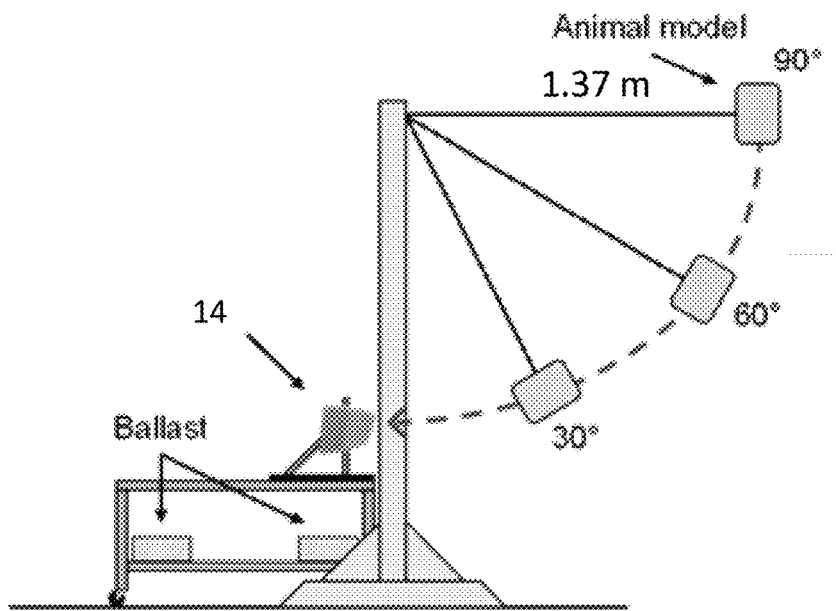
FIGS. 9A and 9B illustrate a testing setup for the flexible piezoelectric impact sensor of FIGS. 1B and 1C using a legform model (FIG. 9A) and using an animal model (FIG. 9B).
Figure 9B:
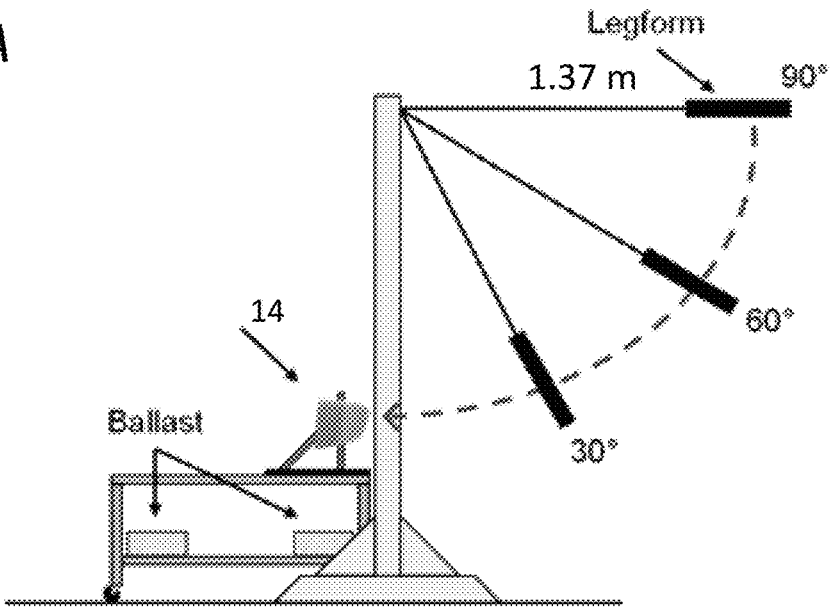
Figure 9C:
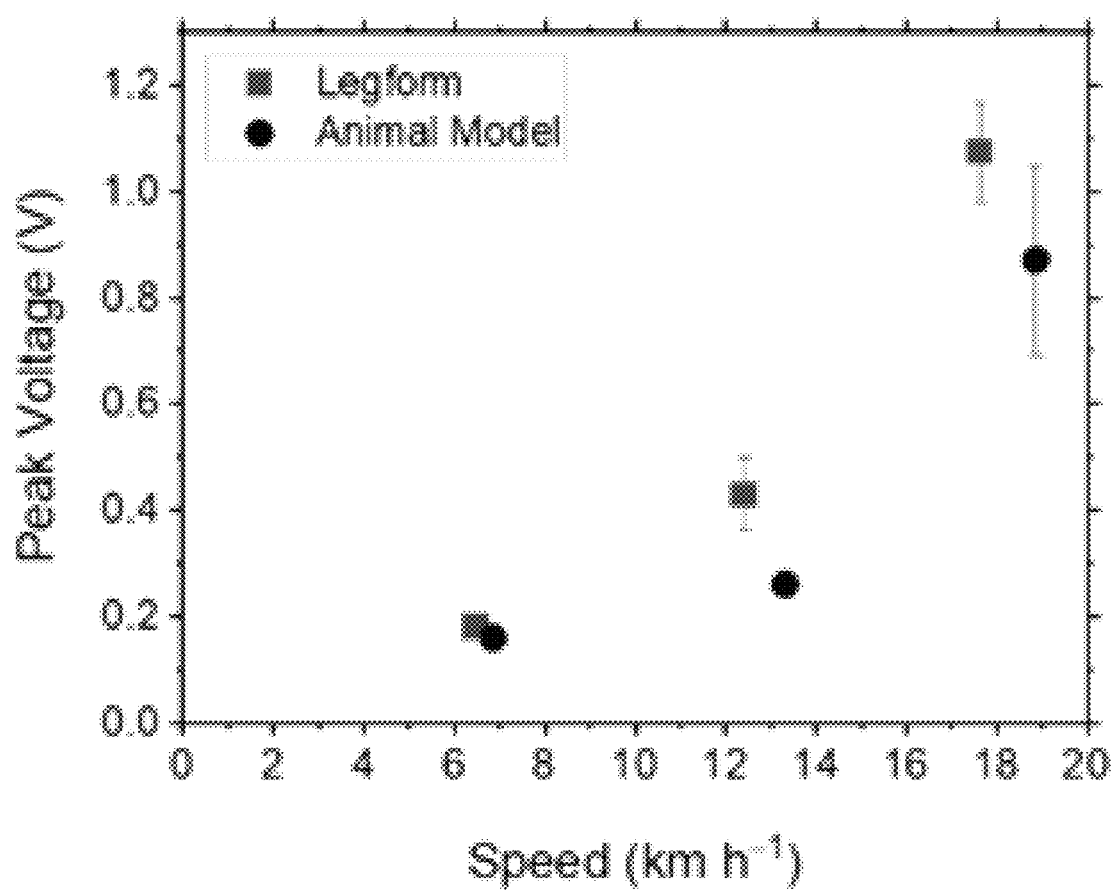
FIG. 9C shows a graph of data showing effect of impact velocity on the plastic bumper assembly of FIG. 4A from the testing setups of FIGS. 9A and 9B.
Figure 10A:
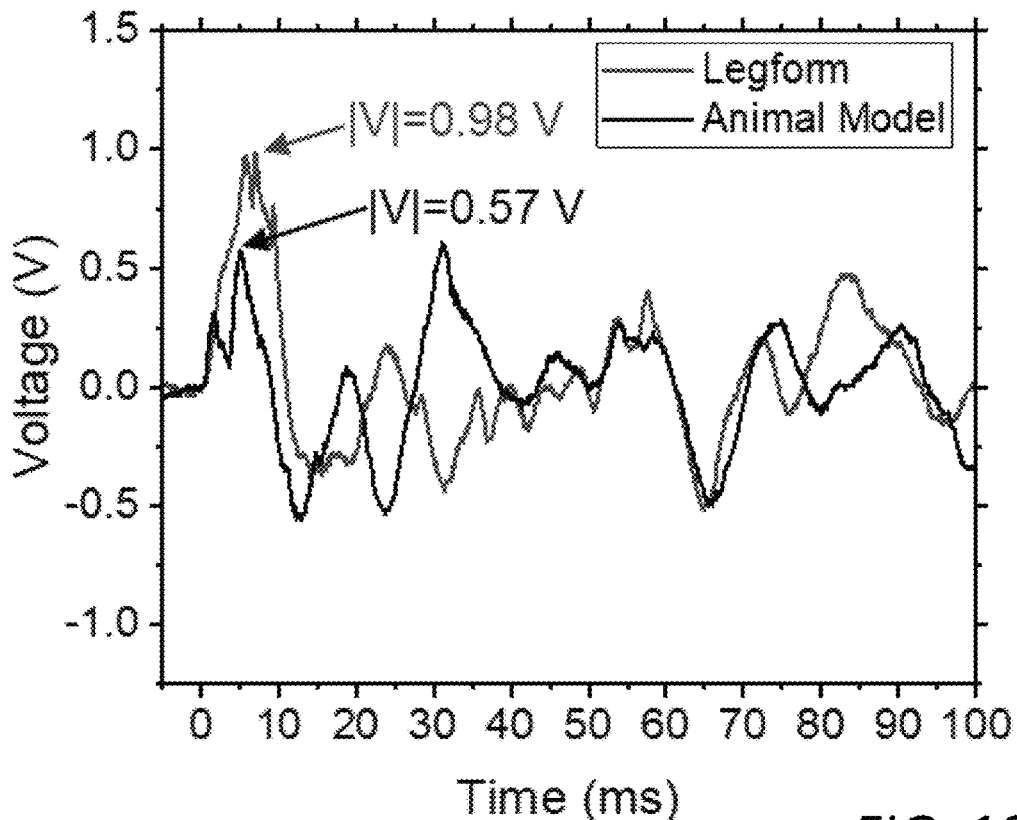
FIGS. 10A and 10B show graphs of test data demonstrating an enhanced discrimination between impactors based on the voltage difference as compared to a polydimethylsiloxane (PDMS)-based sensor based on elastic modulus of the matrix.
Figure 10B:
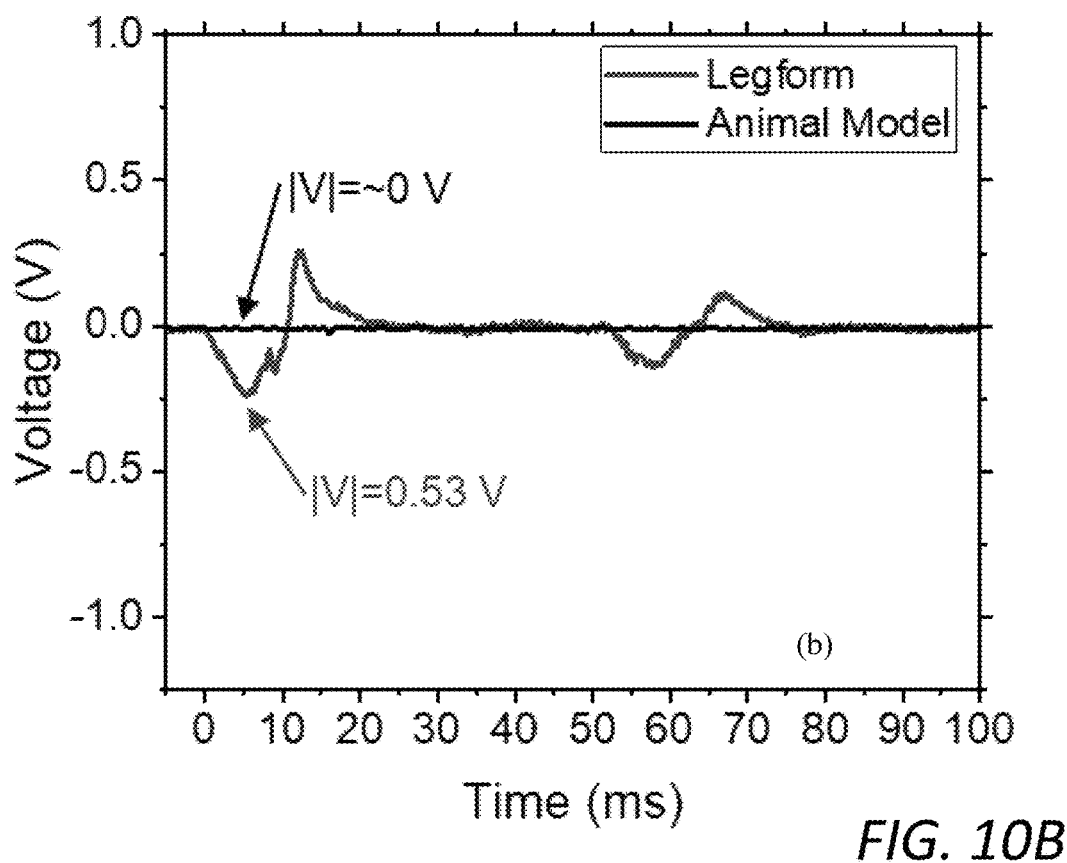

FIGS. 9A through 9C illustrate the effect of velocity on the voltage output of the impact sensor 12 for direct impact on the plastic bumper fascia 14. Data were collected for the legform model (FIG. 9A) and the animal model (FIG. 9B). In FIG. 9C, the peak voltages are plotted vs. velocity. At the higher impact velocities, the legform was further differentiated from the animal model by producing higher peak voltages.

FIG. 10A illustrates plots that show the voltage signals output by the OG675-based sensor for impacts involving the legform model and the animal model on the plastic bumper fascia 14. An overlay of signals from the legform and animal-model impacts are shown, with absolute peak voltages of 0.98 V and 0.57 V, respectively. In FIG. 10B, the overall for the metal bumper 34 shows absolute peak voltages of 0.53 V and ca. 0 V for the legform model and the animal model, respectively. The increased modulus enhanced the discrimination between the legform model and the animal model impactors, manifested by the larger voltage differences.

The technology disclosed herein can give rise to several useful developments, arrangements, and uses. In some arrangements, the technology disclosed herein provides a method for producing a piezoelectric composite via E-field alignment. Applying layers with the same matrix material may provide a robust interface and maintain mechanical flexibility/conformability. A vehicle system including a piezoelectric film-based sensor 12 as disclosed herein can operate in an unpowered state, for example to identify an impact object via compression and elastic wave propagation, because the flexible piezoelectric sensor 12 can function to sense impacts without electrical power input from the vehicle's electrical system. The performance of the flexible piezoelectric sensor 12 is tunable via its materials properties. For example, increasing the modulus of the matrix 28 significantly improves the discrimination ability of the sensor 12 as illustrated in the data shown in FIGS. 10A and 10B. In some arrangements, a mechanically flexible, conformable piezoelectric sensor 12 of the present invention can be elastically deformed to conform to the complex shape of a bumper fascia without prior shaping during the sensor's manufacturing process, which may provide greater flexibility in the design form factor and adapting to an arbitrary geometry. Other benefits for a vehicle may include, for example, a wake function to activate other systems such as security systems when needed while minimizing the power draw from the battery.

In some arrangements, the technology disclosed herein provides a method for sensing impact between the host vehicle and an object. The flexible piezoelectric sensor 12 can provide rapid impact response (a few milliseconds). The flexible piezoelectric sensors 12 can be calibrated with voltage output versus impact energy, for example, as illustrated in FIGS. 2A through 3. Offline analysis may be performed to threshold time- and frequency-domain data, building a framework for online analysis, for example, as illustrated in FIGS. 6A through 10B.

Using the sensor technology of the present invention, discrimination between a pedestrian (represented by hardest-to-detect (HTD) legform) and a small animal (represented by a small-animal model) can be achieved. For example, such differentiation can be based on voltage and/or amplitude differences in the electrical signal generated by the sensor 12 within about the first 10-20 ms after the initial impact with either a pedestrian or a non-pedestrian object, as illustrated by FIGS. 6A through 7D, 10A, and 10B.

It is possible to achieve low material and manufacturing costs, such as much less ceramic material than in common piezoelectric sensors, because the use of a costly and rigid 100% bulk ceramic can be avoided. Other benefits, advantages, uses, and configurations are also possible.

As previously noted above, though the foregoing detailed description describes certain aspects of one or more particular embodiments of the invention, alternatives could be adopted by one skilled in the art. For example, the flexible piezoelectric composite film 16, flexible piezoelectric impact sensor 12, pedestrian protection system 10, and their various components and arrangements could differ in appearance and construction from the embodiments described herein and shown in the drawings, functions of certain components of the flexible piezoelectric composite film 16, flexible piezoelectric impact sensor 12, pedestrian protection system 10 could be performed by components of different construction but capable of a similar (though not necessarily equivalent) function, and various materials could be used in the fabrication of the flexible piezoelectric composite film 16, flexible piezoelectric impact sensor 12, pedestrian protection system 10 and/or their components. As such, and again as was previously noted, it should be understood that the invention is not necessarily limited to any particular embodiment described herein or illustrated in the drawings.

The invention claimed is:

1. A flexible piezoelectric impact sensor comprising:
   a flexible piezoelectric composite film comprising a flexible matrix and a plurality of piezoelectric particles dispersed and embedded within the flexible matrix, wherein the piezoelectric particles are arranged in columns aligned in a Z-direction along a thickness of the flexible matrix;
   a first flexible electrode disposed on a first side of the flexible piezoelectric composite film; and
   a second flexible electrode disposed on a second side of the flexible piezoelectric composite film opposite the first side;
   wherein each of the first flexible electrode and the second flexible electrode comprises electrically conductive particles embedded within a flexible matrix; and
   wherein the flexible matrix of the flexible electrodes is the same as the flexible matrix of the flexible piezoelectric composite film.

2. The flexible piezoelectric impact sensor of claim 1, wherein the piezoelectric particles comprise a piezoelectric ceramic material.

3. The flexible piezoelectric impact sensor of claim 2, wherein the piezoelectric ceramic material comprises lead zirconate titanate.

4. The flexible piezoelectric impact sensor of claim 1, wherein the flexible matrix comprises at least one of a polymer matrix and an epoxy matrix.

5. The flexible piezoelectric impact sensor of claim 4, wherein the polymer matrix comprises polydimethylsiloxane (PDMS).

6. The flexible piezoelectric impact sensor of claim 1, further comprising an electrical interconnect coupled to the first flexible electrode.

7. The flexible piezoelectric impact sensor of claim 1, wherein the flexible piezoelectric impact sensor is moldable to a shape of a bumper fascia without prior shaping during manufacture of the flexible piezoelectric impact sensor.

8. The flexible piezoelectric impact sensor of claim 1, wherein the flexible piezoelectric impact sensor is operable to sense impacts without electrical power input.

9. A pedestrian protection system implemented on an automobile, the pedestrian protection system comprising:
 a bumper assembly on the automobile;
 a flexible piezoelectric impact sensor in accordance with claim 1 coupled to the bumper assembly; and
 a pedestrian protective measure, wherein the pedestrian protective measure is configured to be activated when the flexible piezoelectric impact sensor senses an impact with a pedestrian.

10. The pedestrian protection system of claim 9, wherein the pedestrian protective measure is configured to not be activated when the flexible piezoelectric impact sensor senses an impact with a non-human object.

11. A method of producing an impact sensor with a flexible piezoelectric composite film, the method comprising:
 combining piezoelectric particles and graphite nanoplatelet particles in a polymer resin;
 mixing the piezoelectric particles, the graphite nanoplatelet particles, and the polymer resin to form a substantially homogenous dispersion;
 adding a hardener to the substantially homogeneous dispersion to form a slurry;
 casting the slurry into a substantially two-dimensional cast sheet having a thickness;
 applying an electrical field to the cast sheet to align the piezoelectric particles and the graphite nanoplatelet particles in columns aligned in a Z-direction along the thickness of the cast sheet;
 curing the cast sheet while maintaining the electrical field to form the flexible piezoelectric composite film having the piezoelectric particles and the graphite nanoplatelet particles embedded in a polymer matrix formed by the polymer resin;
 forming an impact sensor from the piezoelectric particles; and
 tuning performance of the impact sensor by adjusting the modulus of the polymer matrix to improve discrimination ability of the impact sensor.

12. The method of claim 11, wherein the piezoelectric particles comprise a piezoelectric ceramic material.

13. The method of claim 12, wherein the piezoelectric ceramic material comprises lead zirconate titanate.

14. The method of claim 11, wherein the polymer resin comprises polydimethylsiloxane (PDMS) resin.

15. The method of claim 11, wherein the step of applying an electrical field comprises applying about 1 kV/mm at 100 Hz.

16. The method of claim 11, wherein the step of curing comprises curing at a temperature of approximately 80° C.

* * * * *